United States Patent [19]

Vanmaele

[11] Patent Number: 5,371,228
[45] Date of Patent: Dec. 6, 1994

[54] DYES AND DYE-DONOR ELEMENTS FOR USE IN THERMAL DYE SUBLIMATION TRANSFER

[75] Inventor: Luc J. Vanmaele, Lochristi

[73] Assignee: AGFA-Gevaert, N.V., Mortsel

[21] Appl. No.: 933,814

[22] Filed: Aug. 24, 1992

Related U.S. Application Data

[62] Division of Ser. No. 709,821, Jun. 4, 1991, Pat. No. 5,142,089, which is a division of Ser. No. 524,461, May 17, 1990, Pat. No. 5,026,677.

[30] Foreign Application Priority Data

May 31, 1989 [EP] European Pat. Off. ........ 89201382.2

[51] Int. Cl.$^5$ .............................................. C07D 213/02
[52] U.S. Cl. ........................................ 546/261; 540/1;
546/22; 546/104; 546/176; 546/323; 546/326;
546/330; 548/477; 548/517; 549/5; 549/13;
549/23; 549/26; 549/216; 549/388; 549/404;
549/425; 549/426
[58] Field of Search ................ 540/1; 546/261, 330;
548/477, 517; 549/13, 426

[56] References Cited

U.S. PATENT DOCUMENTS 4,146,707  3/1979  Van Allan et al. ............. 549/13 X

OTHER PUBLICATIONS

Regaila et al, Egyptian Journal of Pharmaceutical Sciences, vol. 30(1-4), 1989, pp. 159-170.
Regaila et al, Chemical Abstracts, vol. 112 (1989) 157949v.
VanAllan et al, Chemical Abstracts, vol. 74 (1970) 53594f.

*Primary Examiner*—Richard L. Raymond
*Attorney, Agent, or Firm*—Breiner & Breiner

[57] ABSTRACT

Dye-donor element for use according to thermal dye sublimation transfer comprising a support having thereon a dye layer containing a dye corresponding to the following formula

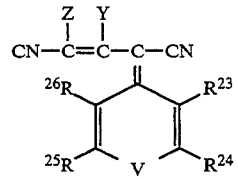

wherein Z represents CN, COOR$^1$ or CONR$^2$R$^3$;

R$^1$, R$^2$ and R$^3$ each independently represent hydrogen, alkyl, cycloalkyl, aryl, or R$^2$ and R$^3$ together represent the necessary atoms to close a heterocyclic nucleus;

Y represents OR$^4$ or NR$^5$R$^6$;

R$^4$ represents hydrogen, alkyl, cycloalkyl, aryl, SO$_2$R$^7$, COR$^7$, CSR$^7$, POR$^7$R$^8$;

R$^5$ and R$^6$ each independently has one of the significances given to R$^4$ or represent amino, or R$^5$ and R$^6$ together represent the necessary atoms to close a heterocyclic nucleus, including a heterocyclic nucleus with an aliphatic or aromatic ring fused-on;

R$^7$ and R$^8$ each independently represent alkyl, cycloalkyl, alkenyl, aralkyl, aryl, alkyloxy, aryloxy, alkylthio, arylthio, amino or a heterocyclic group or R$^7$ and R$^8$ together represent the necessary atoms to close a 5- or 6-membered ring;

V represents O, S, Se, Te, NR$^{27}$;

R$^{23}$, R$^{24}$, R$^{25}$ and R$^{26}$ each independently represent hydrogen, alkyl, alkenyl, cycloalkyl, aryl, alkyloxycarbonyl, aryloxycarbonyl, carbonamido, or R$^{23}$ and R$^{24}$ together and/or R$^{25}$ and R$^{26}$ together represent the necessary atoms to close (a) ring(s) fused-on the nucleus and R$^{27}$ represents hydrogen, alkyl, cycloalkyl, aryl or amino, with the provision that Y is not a NH$_2$-group.

2 Claims, No Drawings

DYES AND DYE-DONOR ELEMENTS FOR USE IN THERMAL DYE SUBLIMATION TRANSFER

This is a division of pending application Ser. No. 07/709,821 filed on Jun. 4, 1991; which, now U.S. Pat. No. 5,142,089, in turn, is a division of application Ser. No. 07/524,461 filed May 17, 1990, which has issued as U.S. Pat. No. 5,026,677.

The present invention relates to dye-donor elements for use according to thermal dye sublimation transfer and to novel dyes for use in said dye-donor elements.

Thermal dye sublimation transfer is a recording method in which a dye-donor element provided with a dye layer containing sublimable dyes having heat transferability is brought into contact with a receiver sheet and selectively, in accordance with a pattern information signal, heated with a thermal printing head provided with a plurality of juxtaposed heat-generating resistors, whereby dye from the selectively heated regions of the dye-donor element is transferred to the receiver sheet and forms a pattern thereon, the shape and density of which is in accordance with the pattern and intensity of heat applied to the dye-donor element.

A dye-donor element for use according to thermal dye sublimation transfer usually comprises a very thin support e.g. a polyester support, one side of which is covered with a dye layer, which contains the printing dyes. Usually an adhesive or subbing layer is provided between the support and the dye layer. Normally the opposite side is covered with a slipping layer that provides a lubricated surface against which the thermal printing head can pass without suffering abrasion. An adhesive layer may be provided between the support and the slipping layer.

The dye layer can be a monochrome dye layer or it may comprise sequential repeating areas of different dyes like e.g. cyan, magenta and yellow dyes. When a dye-donor element containing three or more primary color dyes is used, a multicolor image can be obtained by sequentially performing the dye transfer process steps for each color Any dye can be used in such a dye layer provided it is easily transferable to the dye-image-receiving layer of the receiver sheet by the action of heat.

Typical and specific examples of dyes for use in thermal dye sublimation transfer have been described in, e.g., EP 209990, EP 209991, EP 216483, EP 218397, EP 227095, EP 227096, EP 229374, EP 235939. EP 247737, EP 257577, EP 257580, EP 258856, EP 279330, EP 279467. EP 285665, U.S. Pat. Nos. 4,743,582, 4,753,922, 4,753,923, 4,757,046, 4,769,360, 4,771,035, JP 84/78894, JP 84/78895, JP 84/78896, JP 84/227490, JP 84/227948, JP 85/27594, JP 85/30391, JP 85/229787, JP 85/229789, JP 85/229790, JP 85/229791, P 85/229792, JP 85/229793, JP 85/229795, JP 86/41596, JP 86/268493, JP 86/268494, JP 86/268495 and JP 86/284489.

It is an object of the present invention to provide novel dye-donor elements for use according to thermal dye sublimation transfer printing.

It is another object of the present invention to provide novel dyes which may be used in said dye-donor elements.

Other objects will become apparent from the description hereinafter.

In accordance with the present invention a dye-donor element for use according to thermal dye sublimation transfer is provided, said dye-donor element comprising a support having thereon a dye layer containing a dye characterized in that said dye corresponds to the following formula

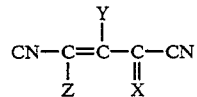

wherein
Z represents CN, COOR$^1$ or CONR$^2$R$^3$;
R$^1$R$^2$ and R$^3$ each independently represent hydrogen, substituted or unsubstituted alkyl, substituted or unsubstituted cycloalkyl, substituted or unsubstituted aryl, or R$^2$ and R$^3$ together represent the necessary atoms to close a heterocyclic nucleus or substituted heterocyclic nucleus;
Y represents OR$^4$ NR$^5$R$^6$ or CN;
R$^4$ represents hydrogen, substituted or unsubstituted alkyl, substituted or unsubstituted cycloalkyl, substituted or unsubstituted aryl, SO$_2$R$^7$, COR$^7$, CSR$^7$, POR$^7$R$^8$;
R$^5$ and R$^6$ each independently has one of the significances given to R$^4$ or represent substituted or unsubstituted amino, or R$^5$ and R$^6$ together represent the necessary atoms to close a heterocyclic nucleus or substituted heterocyclic nucleus, including a heterocyclic nucleus with an aliphatic or aromatic ring fused-on;
R$^7$ and R$^8$ each independently represent substituted or unsubstituted alkyl, substituted or unsubstituted cycloalkyl, substituted or unsubstituted alkenyl, substituted or unsubstituted aralkyl, substituted or unsubstituted aryl, substituted or unsubstituted alkyloxy, substituted or unsubstituted aryloxy, substituted or unsubstituted alkylthio, substituted or unsubstituted arylthio, substituted or unsubstituted amino or a substituted or unsubstituted heterocyclic group or R$^7$ and R$^8$ together represent the necessary atoms to close 5- or 6-membered ring;
X represents N—Ar, N—Het, CR$^9$R$^{10}$, N—NR$^{11}$R$^{12}$ or N—N=CR$^{13}$R$^{14}$;
Ar represents an aromatic nucleus substituted in para position by a substitutent chosen from the group consisting of substituted or unsubstituted amino, substituted or unsubstituted alkyloxy, substituted or unsubstituted aryloxy, substituted or unsubstituted alkylthio, substituted or unsubstituted arylthio, hydroxy, mercapto;
Het represents a substituted or unsubstituted heterocyclic ring;
R$^9$ and R$^{10}$ each independently represents hydrogen, substituted or unsubstituted alkyl, substituted or unsubstituted cycloalkyl, substituted or unsubstituted aryl, substituted or unsubstituted alkenyl, substituted or unsubstituted alkynyl, a substituted or unsubstituted heterocyclic ring, cyano, halogen SO$_2$R$^7$, COR$^7$, CSR$^7$, POR$^7$R$^8$ or R$^9$ and R$^{10}$ together represent the necessary atoms to close a substituted or unsubstituted ring including a substituted or unsubstituted heterocyclic ring;
R$^{11}$ represents a substituted or unsubstituted aromatic ring, including a substituted or unsubstituted aromatic heterocyclic ring;
R$^{12}$ has one of the significances given to R$^4$ and
R$^{13}$ and R$^{14}$ each independently represent hydrogen, substituted or unsubstituted alkyl, substituted or unsubstituted cycloalkyl, substituted or unsubstituted aryl, or $R^{13}$ and $R^{14}$ together represent the necessary atoms to close a substituted or unsubstituted heterocyclic nucleus, including a heterocyclic nucleus with an aliphatic or aromatic ring fused-on.

According to a special embodiment of this invention wherein X represents N—Ar, the dyes correspond to general formula (I)

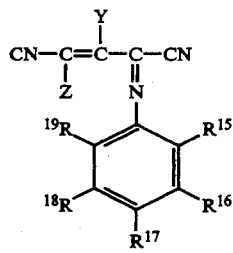

wherein

Z and Y are defined as hereinbefore;

$R^{15}$, $R^{16}$, $R^{18}$ and $R^{19}$ each independently represent hydrogen substituted or unsubstituted alkyl, substituted or unsubstituted cycloalkyl, substituted or unsubstituted aryl, substituted or unsubstituted alkyloxy, substituted or unsubstituted aryloxy, substituted or unsubstituted carbonamido, substituted or unsubstituted sulfamido, hydroxy, halogen, NH—SO₂R⁷, NH—COR⁷, O—SO₂R⁷, O—COR⁷, $R^7$ being as defined hereinbefore, or $R^{15}$ and $R^{16}$ together and/or $R^{18}$ and $R^{19}$ together represent the necessary atoms to close (a) substituted or unsubstituted ring(s) fused-on the benzene ring or $R^{16}$ and/or $R^{18}$ together with $R^{21}$ and/or $R^{22}$ represent the necessary atoms to close a substituted or unsubstituted heterocyclic ring fused-on the benzene ring;

$R^{17}$ represents $OR^{20}$, $SR^{20}$ or $NR^{21}R^{22}$;

$R^{20}$ represents hydrogen, substituted or unsubstituted alkyl, substituted or unsubstituted cycloalkyl, substituted or unsubstituted aryl and $R^{21}$ and $R^{22}$ each independently has one of the significances given to $R^{20}$ or represent a substituted or unsubstituted heterocyclic group or $R^{21}$ and $R^{22}$ together represent the necessary atoms to close a substituted or unsubstituted heterocyclic ring or $R^{21}$ and/or $R^{22}$ together with $R^{16}$ and/or $R^{18}$ represent the necessary atoms to close a substituted or unsubstituted heterocyclic ring fused-on the benzene ring.

Hereinafter * represents the linking position.

Representative examples of dyes according to formula (I) are listed below in table 1.

TABLE 1

| Z | Y | $R^{15}$ | $R^{16}$ | $R^{17}$ | $R^{18}$ | $R^{19}$ | no. |
|---|---|---|---|---|---|---|---|
| CN | N(CH₂C₆H₅)₂ | H | H | N(C₂H₅)₂ | H | H | I.1 |
| CN | (piperazine: N—NH ring) | CH₃ | H | N(C₂H₅)₂ | H | H | I.2 |
| CN | OCH₃ | CH₃ | CH₃ | N(C₂H₅)₂ | CH₃ | CH₃ | I.3 |
| CN | NHSO₂C₆H₄CH₃ | CH₃ | H | N(—C₂H₅)(C₂H₄NHSO₂CH₃) | H | H | I.4 |
| CN | N(—CH₂C₆H₅)(COOC₂H₅) | CH₃ | H | N(—C₂H₅)(C₂H₄OH) | H | H | I.5 |
| CN | (succinimido: O=〈N〉=O ring) | NHCOCH₃ | H | N(C₂H₅)₂ | H | H | I.6 |
| CN | N(—COCH₃)(SO₂C₆H₄CH₃) | H | H | (2,2,6,6-tetramethyl-N-CH₃-piperidinyl) | H | H | I.7 |
| CN | N(COOC₂H₅)₂ | CH₃ | H | N(—C₂H₅)(C₂H₄NHSO₂CH₃) | H | H | I.8 |
| COOCH₃ | (succinimido: O=〈N〉=O ring) | CH₃ | H | N(C₂H₅)₂ | H | CH₃ | I.9 |
| COOC₂H₅ | (piperidino ring: N〈 〉) | H | H | N(C₄H₉)₂ | H | H | I.10 |

TABLE 1-continued

| Z | Y | R15 | R16 | R17 | R18 | R19 | no. |
|---|---|---|---|---|---|---|---|
| CN | $OSO_2N(CH_3)_2$ | H | H | $N(C_3H_7)_2$ | H | H | I.11 |
| CN | $NHCOCH=CH_2$ | H | H | N—$C_2H_5$ / $C_{16}H_{33}$ | H | H | I.12 |
| CN | $NH_2$ | $NHCOCH_3$ | H | $N(C_2H_5)_2$ | H | H | I.13 |
| CN | $OCH_2C_6H_5$ | H | | 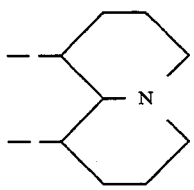 | | H | I.14 |
| CN | N—$COOC_2H_5$ / $C_2H_5$ | H | | 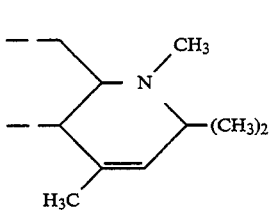 | H | H | I.15 |
| CN | $N(COOC_2H_5)_2$ | H | H | $N(C_2H_5)_2$ | H | H | I.16 |
| CN | CN | $NHCOC(CH_3)_3$ | H | $N(C_2H_5)_2$ | H | H | I.17 |
| CN | $NHCOC(CH_3)=CH_2$ | $CH_3$ | $CH_3$ | $N(C_2H_5)_2$ | $CH_3$ | $CH_3$ | I.18 |
| CN | $N(COOC_2H_5)_2$ | $CH_3$ | H | N—$C_2H_5$ / $C_2H_4N$—$SO_2CH_3$ / $COOC_2H_5$ | H | H | I.19 |
| CN | N—$COOC_2H_5$ / $SO_2C_4H_6CH_3$ | $CH_3$ | H | $N(C_2H_5)_2$ | H | H | I.20 |
| CN | N—$CH_2C_6H_5$ / $SO_2CH_3$ | H | H | $N(C_2H_5)_2$ | H | H | I.21 |
| CN | 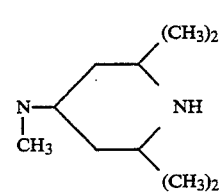 | $NHCOCH_3$ | H | $N(C_2H_5)_2$ | H | H | I.22 |
| CN | $NHCOOCH_3$ | H | H | N—$C_4H_9$ / $C_3H_6SO_3H$ | H | H | I.23 |
| CN | N—CH(CH_3)_2 / CH_3, NH, (CH_3)_2 (bicyclic amine) | $CH_3$ | H | $N(C_2H_5)_2$ | H | $CH_3$ | I.24 |
| CN | $NH_2$ | $NHCOCH(CH_3)_2$ | H | $N(C_2H_5)_2$ | H | H | I.25 |
| CN | $NH_2$ | H | H | $N(C_3H_7)_2$ | H | H | I.26 |
| CN | $NHCOC_6H_5$ | H | H | N—$C_2H_5$ / $C_{16}H_{33}$ | H | H | I.27 |
| CN | $N(COOC_2H_5)_2$ | $NHCOCH_3$ | H | $N(C_2H_5)_2$ | H | H | I.28 |

TABLE 1-continued

| Z | Y | R¹⁵ | R¹⁶ | R¹⁷ | R¹⁸ | R¹⁹ | no. |
|---|---|---|---|---|---|---|---|
| CN | N(CH₃)₂ | H | | (piperidine-2,6-diyl) | | H | I.29 |
| CN | NHSO₂CH₃ | H | H | N(C₂H₅)₂ | H | H | I.30 |
| CN | NH₂ | N(SO₂CH₃)₂ | H | N(C₂H₅)₂ | H | H | I.31 |
| CN | NH₂ | CH₃ | H | N(C₂H₅)₂ | H | H | I.32 |
| CN | OCH(CH₃)₂ | CH₃ | CH₃ | N(C₂H₅)₂ | CH₃ | CH₃ | I.33 |
| CN | N(COOC₂H₅)(COCH₃) | CH₃ | H | N(C₂H₅)(C₂H₄NHSO₂CH₃) | H | H | I.34 |
| CN | N(COOC₂H₅)(COOCH₂C₆H₄NO₂) | NHCOCH₃ | H | N(C₂H₅)₂ | H | H | I.35 |
| CN | N(COOC₁₆H₃₃)₂ | NHCOCH₃ | H | N(C₂H₅)₂ | H | H | I.36 |
| CN | N(COOC₂H₅)₂ | H | | (dicyclopentano-fused piperidine) | | H | I.37 |
| CN | N(COOC₂H₅)(SO₂C₆H₄NHCOCH₃) | H | H | N(C₂H₅)₂ | H | H | I.38 |
| CN | NHCOOC₄H₉ | CH₃ | H | N(C₂H₅)₂ | H | CH₃ | I.39 |
| CN | NHCOC₂H₅ | H | H | N(C₄H₉)₂ | H | H | I.40 |
| CN | OC₆H₄CH₃ | H | H | N(C₃H₇)₂ | H | H | I.41 |
| CN | NH₂ | H | H | N(C₂H₅)(C₁₆H₃₃) | H | H | I.42 |
| CN | OC(CH₃)₃ | NHCOCH₃ | H | N(C₂H₅)₂ | H | H | I.43 |
| CN | NHSO₂C₆H₅ | H | | (piperidine-2,6-diyl) | | H | I.44 |
| CN | NHCOOC(CH₃)₃ | H | | (N-methyl tetrahydropyridine substituent) | H | H | I.45 |
| CN | NH₂ | NHCOC₅H₁₁ | H | N(C₂H₅)₂ | H | H | I.46 |
| CN | OCOCH₃ | CH₃ | H | N(C₂H₅)₂ | H | H | I.47 |
| CN | N(C₃H₇)₂ | CH₃ | CH₃ | N(C₂H₅)₂ | CH₃ | CH₃ | I.48 |

TABLE 1-continued

| Z | Y | R15 | R16 | R17 | R18 | R19 | no. |
|---|---|---|---|---|---|---|---|
| CN | NH2 | CH3 | H | N(C2H5)(C2H4NHSO2CH3) | H | H | I.49 |
| CN | NHCOCH3 | CH3 | H | N(C2H5)(C2H4OH) | H | H | I.50 |
| CN | NH2 | H | H | N(C2H4OH)2 | H | H | I.51 |
| CN | 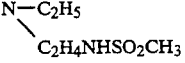 (succinimide) | H | | 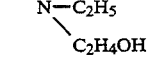 | | H | I.52 |
| CN | 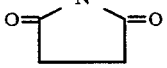 (imidazole) | H | H | N(C4H9)2 | H | H | I.53 |
| CN | NHCOOCH2C6H5 | CH3 | H | N(C2H5)2 | H | CH3 | I.54 |
| CN | N(PO(OC6H5)2)2 | H | H | N(C4H9)2 | H | H | I.55 |
| COOCH3 | NHCOCH=CH2 | H | H | N(C3H7)2 | H | H | I.56 |
| CN | OCOC3H7 | H | H | N(C2H5)(C16H33) | H | H | I.57 |
| COOC2H5 | N(COOC4H9)2 | NHCOCH3 | H | N(C2H5)2 | H | H | I.58 |
| COOCH3 | N(CH3)2 | H | | 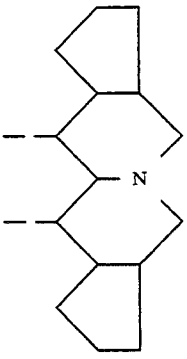 | | H | I.59 |
| CN | N(COOCH3)2 | H | |  | | H | I.60 |
| CN | NH2 | H | H | N(C2H5)2 | H | H | I.61 |
| CN | NH2 | NHCOC7H15 | H | N(C2H5)2 | H | H | I.62 |
| CN | NHPO(OC6H5)2 | CH3 | CH3 | N(C2H5)2 | CH3 | CH3 | I.63 |
| CN | NH2 | H | H | N(CH3)(C2H4CN) | H | H | I.64 |
| CN | N(COOC4H9)2 | H | H | N(C4H9)(CH2C6H5) | H | H | I.65 |
| COOC2H5 | N(C2H4OH)2 | H | H | N(C2H4OH)2 | H | H | I.66 |

TABLE 1-continued

| Z | Y | R15 | R16 | R17 | R18 | R19 | no. |
|---|---|---|---|---|---|---|---|
| COOCH3 | NHCOOCH3 | H | H | 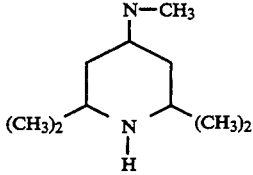 | H | H | I.67 |
| CN | NHPO(OCH3)2 | H | H | N(C4H9)(C3H6SO3H) | H | H | I.68 |
| CN | N(COOC2H5)2 | CH3 | H | N(C2H5)2 | H | CH3 | I.69 |
| CN | NH2 | CH(CH3)2 | H | N(CH3)2 | H | H | I.70 |
| COOCH3 | OH | H | H | N(C3H7)2 | H | H | I.71 |
| COOC2H5 | NHCOOCH2C6H5 | H | H | N(C2H5)(C16H33) | H | H | I.72 |
| CN | NHC6H5 | NHCOCH3 | H | N(C2H5)2 | H | H | I.73 |
| CN | N(COOC4H9)2 | H | | 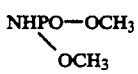 | | H | I.74 |
| CN | OCOC15H31 | H | | 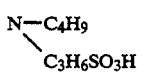 | | H | I.75 |
| CN | 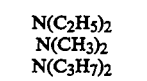 | H | H | N(C2H5)2 | H | H | I.76 |
| CN | N(COOC2H5)2 | CH3 | H | N(C2H5)2 | H | H | I.77 |
| COOC2H5 | 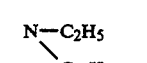 | CH3 | CH3 | N(C2H5)2 | CH3 | CH3 | I.78 |
| CN | OSO2C6H5 | CH3 | H | N(C2H5)(C2H4NHSO2CH3) | H | H | I.79 |
| COOCH3 | NHCOC2H5 | CH3 | H | N(C2H5)(C2H4OH) | H | H | I.80 |
| CN | NHSO2C6H4NHCOCH3 | H | H | N(C2H5)2 | H | H | I.81 |
| CN | NH2 | H | H | 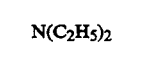 | H | H | I.82 |
| CN | 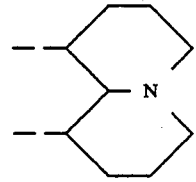 | NHCOCH3 | H | N(C2H5)2 | H | H | I.83 |

TABLE 1-continued

| Z | Y | $R^{15}$ | $R^{16}$ | $R^{17}$ | $R^{18}$ | $R^{19}$ | no. |
|---|---|---|---|---|---|---|---|
| CN | $N(COOC(CH_3)_3)_2$ | $CH_3$ | H | $N(C_2H_5)_2$ | H | $CH_3$ | I.84 |
| CN | $NH_2$ | H | H | $N(C_4H_9)_2$ | H | H | I.85 |
| CN | $OSO_2C_6H_4CH_3$ | H | H | $N(C_3H_7)_2$ | H | H | I.86 |
| CN | $NHC_2H_4OH$ | H | H | $N(C_2H_5)(C_{16}H_{33})$ | H | H | I.87 |
| $COOCH_3$ | $NHSO_2CH_3$ | $NHCOCH_3$ | H | $N(C_2H_5)_2$ | H | H | I.88 |
| $COOC_2H_5$ | $NHCOOC(CH_3)_3$ | H | | (decahydroquinolizine-N) | | H | I.89 |
| CN | $N(COOCH_2C_6H_5)_2$ | H | | (trimethyl-isopropyl-N-methyl piperidine) | H | H | I.90 |
| CN | (tetrachlorophthalimido) | H | H | $N(C_2H_5)_2$ | H | H | I.91 |
| CN | $N(COOC_4H_9)_2$ | $NHCOCH_3$ | H | $N(C_2H_5)_2$ | H | H | I.92 |
| CN | $N(COOC_4H_9)_2$ | $NHCOC_5H_{11}$ | H | $N(C_2H_5)_2$ | H | H | I.93 |
| CN | (succinimido) | $NHCOC_5H_{11}$ | H | $N(C_2H_5)_2$ | H | H | I.94 |
| CN | (methylsuccinimido) | $NHCOC_5H_{11}$ | H | $N(C_2H_5)_2$ | H | H | I.95 |
| CN | $N(COOCH_2CH(CH_3)_2)_2$ | $NHCOCH_3$ | H | $N(C_2H_5)_2$ | H | H | I.96 |
| CN | $NH_2$ | H | | (dicyclopentano-quinolizidine) | | H | I.97 |
| CN | $N(CH_3)(SO_2CH_3)$ | H | H | $N(C_2H_5)_2$ | H | H | I.98 |

TABLE 1-continued

| Z | Y | R¹⁵ | R¹⁶ | R¹⁷ | R¹⁸ | R¹⁹ | no. |
|---|---|---|---|---|---|---|---|
| CN | piperidinyl (N-) | CH₃ | H | N(C₂H₅)₂ | H | CH₃ | I.99 |
| CN | N(COOC₂H₄OC₂H₄OCO)₂ | H | H | N(C₄H₉)₂ | H | H | I.100 |
| COOCH₃ | NHCOC₆H₅ | H | H | N(C₃H₇)₂ | H | H | I.101 |
| COOC₂H₅ | N(—COCH₃)(SO₂C₆H₄CH₃) | H | H | N(—C₂H₅)(C₁₆H₃₃) | H | H | I.102 |
| CN | NHCOOC₄H₉ | NHCOCH₃ | H | N(C₂H₅)₂ | H | H | I.103 |
| CN | N(C₂H₄OH)₂ | H | | decahydroquinolinyl | | H | I.104 |
| CN | N(COO(C₂H₄O)₃CO)₂ | H | | tetrahydropyridinyl (N-CH₃, (CH₃)₂, H₃C) | H | H | I.105 |
| CN | N(—CH₂C₆H₅)(COOC₂H₅) | H | H | N(C₂H₅)₂ | H | H | I.106 |
| CN | N(COOCH₂CH(C₂H₅)C₄H₉)₂ | NHCOCH₃ | H | N(C₂H₅)₂ | H | H | I.107 |
| CN | morpholinyl (N—O) | NHCOC(CH₃)₃ | H | N(C₂H₅)₂ | H | H | I.108 |
| CN | succinimidyl-C₈H₁₇ | H | H | N(—C₄H₉)(CH₂C₆H₅) | H | H | I.109 |
| CN | pyrrolidinyl (N-) | CH₃ | H | N(—C₂H₅)(C₂H₄OH) | H | H | I.110 |
| CN | N(COOC₄H₉)₂ | NHCOCH(CH₃)₂ | H | N(C₂H₅)₂ | H | H | I.111 |
| CN | NH₂ | CH₃ | | dicyclopentane-fused piperidinyl | | H | I.112 |

TABLE 1-continued

| Z | Y | $R^{15}$ | $R^{16}$ | $R^{17}$ | $R^{18}$ | $R^{19}$ | no. |
|---|---|---|---|---|---|---|---|
| CN | N(–CH$_2$C$_6$H$_5$)(SO$_2$C$_6$H$_4$CH$_3$) | NHCOCH$_3$ | H | N(C$_2$H$_5$)$_2$ | H | H | I.113 |
| CN | succinimido | N(SO$_2$CH$_3$)$_2$ | H | N(C$_2$H$_5$)$_2$ | H | H | I.114 |
| CN | 3-methylsuccinimido | H | H | N(–C$_4$H$_9$)(CH$_2$CH$_2$C$_6$H$_5$) | H | H | I.115 |
| CN | morpholino | H | H | N(C$_2$H$_5$)$_2$ | H | H | I.116 |
| CN | 3-octylsuccinimido | NHCOC$_5$H$_{11}$ | H | N(C$_2$H$_5$)$_2$ | H | H | I.117 |
| COOC$_2$H$_5$ | NH$_2$ | NHCOCH$_3$ | H | N(C$_2$H$_5$)$_2$ | H | H | I.118 |
| CN | succinimido | CH$_3$ | | (bicyclic amine structure) | | H | I.119 |
| COOCH$_3$ | NHCOC$_4$H$_9$ | H | | (substituted piperidine structure with N–CH$_3$, (CH$_3$)$_2$, H$_3$C) | H | H | I.120 |
| CN | NH$_2$ | H | H | N(–C$_2$H$_5$)(CH$_2$C$_6$H$_5$) | H | H | I.121 |
| CN | NH$_2$ | OC$_2$H$_5$ | H | N(C$_2$H$_5$)$_2$ | H | H | I.122 |
| CN | N(COCH$_3$)$_2$ | H | H | N(C$_2$H$_5$)$_2$ | H | H | I.123 |
| CN | phthalimido | H | H | N(C$_2$H$_5$)$_2$ | H | H | I.124 |
| CN | N(–COOC$_2$H$_5$)(SO$_2$C$_6$H$_4$CH$_3$) | NHCOCH$_3$ | H | N(C$_2$H$_5$)$_2$ | H | H | I.125 |
| CN | N(–COOC$_2$H$_5$)(SO$_2$CH$_3$) | H | H | N(C$_2$H$_5$)$_2$ | H | H | I.126 |

TABLE 1-continued
| Z | Y | R15 | R16 | R17 | R18 | R19 | no. |
|---|---|---|---|---|---|---|---|
| CN | 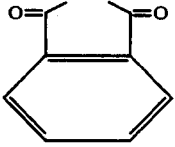 | CH3 | H | N(C2H5)2 | H | H | I.127 |
| CN | 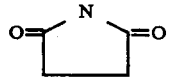 | CH3 | H | N(C2H5)2 | H | H | I.128 |
| CN | NHCOOC2H5 | H | H | N(C2H5)2 | H | H | I.129 |
| CN | 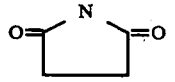 | NHCOC(CH3)3 | H | N(C2H5)2 | H | H | I.130 |
| CN | N(COOC2H5)2 | NHCOC(CH3)3 | H | N(C2H5)2 | H | H | I.131 |
| CN | N(COOCH2C6H5)2 | NHCOC(CH3)3 | H | N(C2H5)2 | H | H | I.132 |
| CN | N(COOCH2C6H5)2 | H | H | N(C2H5)2 | H | H | I.133 |
| CN | 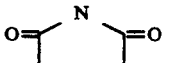 | NHCOCH3 | H | N(C2H5)2 | H | H | I.134 |
| CN | 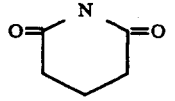 | NHCOCH3 | H | N(C2H5)2 | H | H | I.135 |
| CN |  | NHCOC(CH3)3 | H | N(C2H5)2 | H | H | I.136 |
| CN | 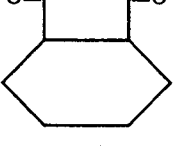 | NHCOC(CH3)3 | H | N(C2H5)2 | H | H | I.137 |
| CN | 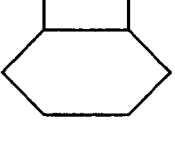 | NHCOCH3 | H | N(C2H5)2 | H | H | I.138 |
| CN | 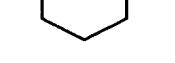 | NHCOC(CH3)3 | H | N(C2H5)2 | H | H | I.139 |
| CN | NH2 | NHCOC(CH3)3 | H | N(C2H5)2 | H | H | I.140 |
| CN | NH2 | OC2H5 | H | N(C4H9)2 | H | H | I.141 |
| CN | 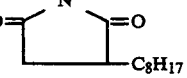 | NHCOCH3 | H | N(C2H5)2 | H | H | I.142 |

TABLE 1-continued

| Z | Y | R15 | R16 | R17 | R18 | R19 | no. |
|---|---|---|---|---|---|---|---|
| CN |  | NHCOCH3 | |  | | H | I.143 |

Dyes according to formula (I) can be obtained by oxidative coupling between a malononitrile dimer and a p-phenylenediamine compound or by condensation of a malononitrile dimer and a nitrosoaryl compound.

The synthesis of malononitrile dimers is described by A. J. Fatiadi in Synthesis, 1978, pages 165 to 204 and by F. Freeman in Chemical Reviews, Vol. 69, 1969, pages 519 to 624.

The synthesis of dyes according to formula (I) wherein Y represents $NH_2$ is described by H. Junek, B. Thierrichter and P. Wibmer in Monatshefte für Chemie, Vol. 110, 1979, pages 483 to 492 and in U.S. Pat. No. 2,926,187. Dyes according to formula (I) wherein Y is not $NH_2$ have not been described before.

Among the dyes according to formula (I) those wherein Z is CN and Y is $NR^5R^6$ are preferred; and among those the dyes wherein $R^{17}$ is $NR^{21}R^{22}$ are preferred.

The dyes according to the present invention wherein X represents $CR^9R^{10}$, can be represented by the following formula (II)

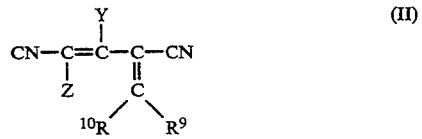

wherein Z, Y, $R^9$ and $R^{10}$ are defined as hereinbefore.

In a particular type of dye according to formula (II), $R^9$ and $R^{10}$ together with the C atom to which they are attached represent the necessary atoms to close a pyrone-type nucleus represented by

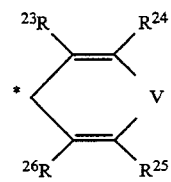

wherein

V represents O, S, Se, Te, $NR^{27}$, preferably O or $NR^{27}$;

$R^{23}$, $R^{24}$, $R^{25}$ and $R^{26}$ each independently represent hydrogen, substituted or unsubstituted alkyl, substituted or unsubstituted alkenyl, substituted or unsubstituted cycloalkyl, substituted or unsubstituted aryl, alkyloxycarbonyl, aryloxycarbonyl, substituted or unsubstituted carbonamido, or $R^{23}$ and $R^{24}$ together and/or $R^{25}$ and $R^{26}$ together represent the necessary atoms to close (a) substituted or unsubstituted ring(s) fused-on the pyrone-type nucleus and $R^{27}$ represents hydrogen, substituted or unsubstituted alkyl, substituted or unsubstituted cycloalkyl, substituted or unsubstituted aryl or amino.

Representative examples of dyes according to formula (II) are listed below in table 2.

TABLE 2

| Z | Y | R9 | R10 | no. |
|---|---|---|---|---|
| COOCH3 | OCOC(CH3)3 | COC6H5 | C6H5 | II.1 |
| CN | NHCOOC(CH3)3 | COC6H4N(CH3)2 | C6H5 | II.2 |
| CN |  | COC6H4N(C2H5)2 | C6H5 | II.3 |
| CN | NH2 |  | H | II.4 |

TABLE 2-continued

| Z | Y | R⁹ | R¹⁰ | no. |
|---|---|---|---|---|
| CN | phthalimide | 4-N(CH₃)₂, 2-OC₁₆H₃₃ phenyl | H | II.5 |
| CN | NH₂ | C₆H₄N(CH₃)₂ | H | II.6 |
| CN | NH₂ | C₆H₄N(C₂H₅)₂ | H | II.7 |
| CN | NH₂ | 4-N(C₂H₅)₂, 2-OC₂H₅ phenyl | H | II.8 |
| CN | NH₂ | CH=CH—C₆H₄N(CH₃)₂ | H | II.9 |
| CN | succinimide | CH=CH—C₆H₄—N(CH₃)₂ | H | II.10 |
| CN | 3-methylsuccinimide | 4-N(C₄H₉)₂, 2-OC₂H₅ phenyl | CN | II.11 |
| CN | NHCOCH₃ | 4-N(C₂H₅)(CH₂COOC₂H₅), 3-Cl phenyl | H | II.12 |
| CN | succinimide | 2,6-dimethyl-tetrahydropyran-4-yl | | II.13 |
| CN | glutarimide | 2,6-dimethyl-tetrahydropyran-4-yl | | II.14 |
| CN | N(COOC₂H₅)₂ | 2,6-dimethyl-tetrahydropyran-4-yl | | II.15 |
| COOCH₃ | N(COOCH₃)₂ | C₆H₄—N(morpholino) | H | II.16 |
| CN | NH₂ | thienyl | H | II.17 |

TABLE 2-continued

| Z | Y | R⁹ | R¹⁰ | no. |
|---|---|---|---|---|
| CN | succinimide (3-methyl) | *CH(CH₃)-O-CH(CH₃) (dihydropyran-type, 2,6-dimethyl) | | II.18 |
| CN | phthalimide | *CH(CH₃)-O-CH(CH₃) (dihydropyran-type, 2,6-dimethyl) | | II.19 |
| CN | glutarimide | *C(CH₃)=CH-N(C₆H₅)-CH=C(CH₃) | | II.20 |
| CN | N(COOC₂H₅)₂ | *C(CH₃)=CH-N(C₆H₅)-CH=C(CH₃) | | II.21 |
| CN | N(COOCH₂CH(CH₃)₂)(COOCH₂CH(C₂H₅)C₄H₉) | *C(CH₃)=CH-O-C(CH₃)=CH (2,6-dimethyl-4H-pyran) | | II.22 |
| CN | succinimide (3-methyl) | *C₆H₃(3-OC₂H₅)(4-N(C₄H₉)₂) | H | II.23 |
| CN | NH₂ | C₆H₄OCH₃ | H | II.24 |
| COOC₂H₅ | N(COOC₂H₅)₂ | *C₆H₃(3-OCH₃)(4-CH₃O) | H | II.25 |
| CN | N(COOC₂H₅)₂ | *C₆H₃(3-OC₁₆H₃₃)(4-N(CH₃)₂) | H | II.26 |
| CN | N(COOC₁₆H₃₃)₂ | *C(CH₃)=CH-O-C(CH₃)=CH (2,6-dimethyl-4H-pyran) | | II.27 |

TABLE 2-continued

| Z | Y | R⁹ | R¹⁰ | no. |
|---|---|---|---|---|
| CN | succinimide (N-linked, O=C-CH₂-CH₂-C=O ring) | *-CH=C(COOCH₃)-O-C(COOCH)=CH- (pyran with COOCH₃ and COOCH substituents) | | II.28 |
| COOC₂H₅ | NHSO₂C₆H₅ | *-C₆H₄-OCH₃ (meta-methoxyphenyl) | H | II.29 |
| CN | NH₂ | C₆H₄N(CH₂COOCH₃)₂ | H | II.30 |
| CN | OSO₂CH₃ | *-pyridyl | H | II.31 |
| CN | N(COOCH₃)₂ | *-CH=C(Cl)-N=C(S-)-N=CHN(CH₃)₂ (chlorothiazole with amidine) | H | II.32 |
| CN | NHCH₂CH(CH₃)₂ | *-CH=CH-(N-methylindole) | H | II.33 |
| CN | phthalimide | *-C₆H₄-N(CH₃)(C₂H₄CN) | H | II.34 |
| CN | N(COOC₂H₅)₂ | CH=CH—C₆H₄N(CH₃)₂ | H | II.35 |
| CN | N(COOC₄H₉)₂ | *-CH=CH-(6-methoxy-N-methylindol-7-yl) | | II.36 |
| CN | succinimide | *-CH=C(C₆H₄N(C₂H₅)₂)-O-C(C₆H₄N(C₂H₅)₂)=CH- (pyran) | | II.37 |

TABLE 2-continued

| Z | Y | R⁹ | R¹⁰ | no. |
|---|---|---|---|---|
| CN | N(COOC₂H₅)₂ | *-CH=C(C₆H₅)-N(C₃H₇)-C(C₆H₅)=CH- (ring) | | II.38 |
| CN | N(COOC₂H₅)₂ | *-CH=C(C₆H₄OCH₃)-O-C(C₆H₄OCH₃)=CH- (ring) | | II.39 |
| CN | succinimido (O=C-N-C=O, CH₂CH₂) | *-CH=C(C₆H₅)-O-C(C₆H₅)=CH- (ring) | | II.40 |
| CN | N(COOC₂H₅)(CH₂C₆H₅) | *-CH=C(C₆H₅)-O-C(C₆H₅)=CH- (ring) | | II.41 |
| CN | succinimido | COC₆H₅ | C₆H₅ | II.42 |
| CN | piperidino | COC₆H₄N(CH₃)₂ | C₆H₅ | II.43 |
| CN | N(COOC(CH₃)₃)₂ | COC₆H₄N(C₂H₅)₂ | C₆H₅ | II.44 |
| CN | N(COOC₂H₅)₂ | C₆H₄N(C₂H₅)₂ | H | II.45 |
| CN | 1,2-dihydropyrazine (N=CH-CH=N-CH=CH) | COC₆H₄N(CH₃)₂ | C₆H₄N(CH₃)₂ | II.46 |
| COOCH₃ | NH(C₂H₄OH)₂ | C₆H₄N(CH₃)₂ | H | II.47 |
| COOCH₃ | morpholino | C₆H₄N(C₂H₅)₂ | H | II.48 |
| COOC₂H₅ | N(COOC₄H₉)₂ | *-C₆H₃(CH₃)-N(C₂H₅)₂ | H | II.49 |
| CN | glutarimido (O=C-N-C=O, (CH₂)₃) | *-CH=C(C₆H₄NO₂)-O-C(C₆H₄NO₂)=CH- (ring) | | II.50 |

TABLE 2-continued
| Z | Y | R⁹ | R¹⁰ | no. |
|---|---|---|---|---|
| CN | 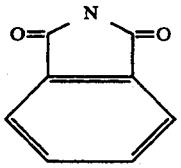 | 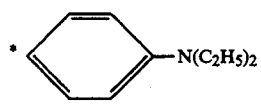 | CN | II.51 |
| CN | 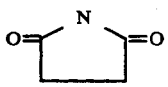 | 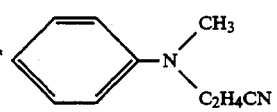 | H | II.52 |
| CN | OH | 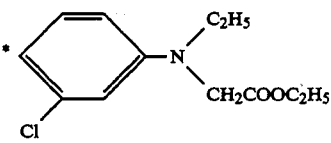 | H | II.53 |
| COOCH₃ |  | 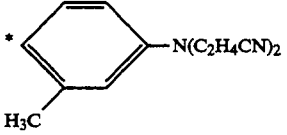 | H | II.54 |
| CN | N(COOC₂H₅)₂ | 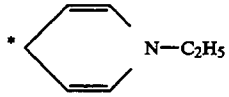 | | II.55 |
| COOC₂H₅ | OH | C₆H₄N—C₂H₅<br>    C₂H₄OC₂H₅ | H | II.56 |
| CN | NHPO(OC₆H₅)₂ | 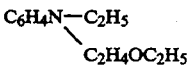 | H | II.57 |
| COOCH₃ | NHSO₂CH₃ | C₆H₄N(C₆H₅)₂ | H | II.58 |
| CN | N(COOC₂H₅)₂ | 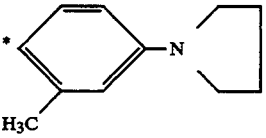 | H | II.59 |
| CN | 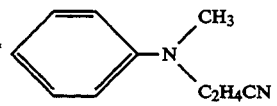 | C₆H₄OCH₃ | H | II.60 |
| CN | N(COOCH₂CH(CH₃)₂)₂ | 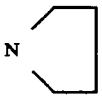 | H | II.61 |
| CN | OC(CH₃)₃ | 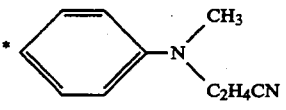 | H | II.62 |

TABLE 2-continued

| Z | Y | R⁹ | R¹⁰ | no. |
|---|---|---|---|---|
| CN | NH₂ | 2,3,4-tri-OCH₃-C₆H₂* | H | II.63 |
| CN | succinimidyl | 2-(N-C₄H₉)(N-C₂H₄C₆H₅)-C₆H₄* | H | II.64 |
| CN | N(COOC₂H₅)₂ | C₆H₄N(CH₃)₂ | H | II.65 |
| CN | OCH₃ | pyridyl* | H | II.66 |
| CN | NH₂ | 2-[N(CH₃)-C(CH₃)=CH-CH(CH₃)₂]-C₆H₄* | H | II.67 |
| CN | NHCO(CH₃)=CH₂ | 1-methylindol-3-yl* | H | II.68 |
| CN | OSO₂CH₃ | 3-OCH₃-4-N(CH₃)₂-C₆H₃* | H | II.69 |
| CN | N(COOCH₂CH(CH₃)₂)₂ | C₆H₄N(CH₂COOCH₃)₂ | H | II.70 |
| CN | NH₂ | 1-methylpyrrol-2-yl* | H | II.71 |
| CN | N(COOCH₂C₆H₅)₂ | 5-N(C₂H₅)₂-1-methylindolin-3-yl* | | II.72 |
| CN | phthalimidyl | 2,5-(C₆H₅)(C₆H₄OCH₃)-4-(N-C₃H₇)-C₆H₂* | | II.73 |

TABLE 2-continued

| Z | Y | R⁹ | R¹⁰ | no. |
|---|---|---|---|---|
| CN | 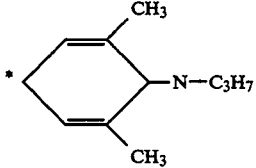 N—COOC₂H₅, SO₂C₆H₄CH₃ | 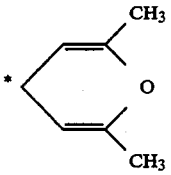 | | II.74 |
| CN | NH₂ | 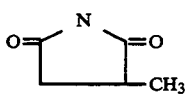 | | II.75 |
| CN | 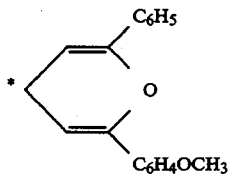 | 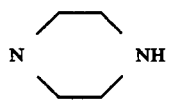 | | II.76 |
| CN | NH₂ | COC₆H₅ | C₆H₅ | II.77 |
| CN | 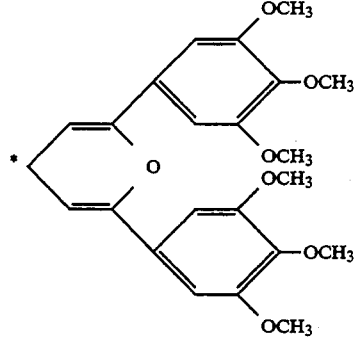 | COC₆H₄N(CH₃)₂ | C₆H₅ | II.78 |
| CN | NHSO₂C₆H₄CH₃ | COC₆H₄N(C₂H₅)₂ | C₆H₅ | II.79 |
| CN | N(COOC₂H₄OC₂H₄OCO)₂ | COC₆H₄Cl | C₆H₄Cl | II.80 |
| COOC₂H₅ | NHCOC(CH₃)₃ | COC₆H₄N(CH₃)₂ | C₆H₄N(CH₃)₂ | II.81 |
| CN | NH₂ | 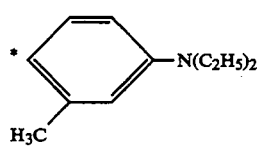 | | II.82 |
| CN | OC₆H₄C₁₆H₃₃ | C₆H₄N(C₂H₅)₂ | H | II.83 |
| CN | 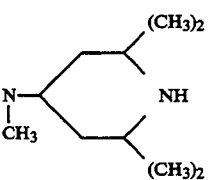 N—COCH₃, SO₂C₆H₄CH₃ | 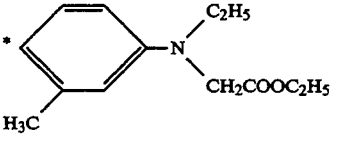 | H | II.84 |
| CN | (structure with (CH₃)₂, N-CH₃, NH, (CH₃)₂) | (structure with C₂H₅, N, CH₂COOC₂H₅, H₃C) | H | II.85 |

TABLE 2-continued
| Z | Y | R⁹ | R¹⁰ | no. |
|---|---|---|---|---|
| CN | NHCOOC$_2$H$_5$ | 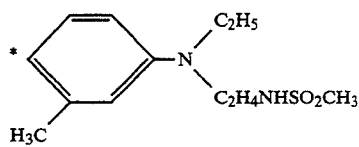 | H | II.86 |
| CN | NHCOOC$_2$H$_5$ | 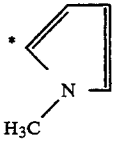 | H | II.87 |
| CN | NHCOCH=CH$_2$ | 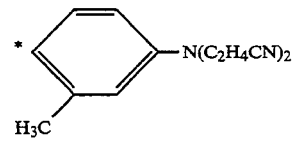 | H | II.88 |
| CN | 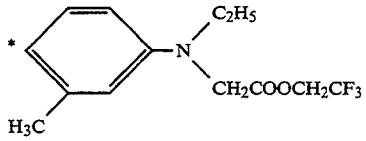 | 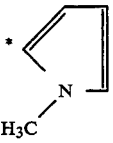 | H | II.89 |
| CN | N(CH$_2$C$_6$H$_5$)$_2$ | 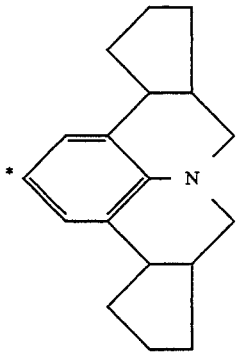 | H | II.90 |
| CN | N(COOC$_2$H$_5$)$_2$ | C$_6$H$_4$N(CH$_2$COOCH$_3$)$_2$ | H | II.91 |
| CN | N(COOC$_2$H$_5$)$_2$ | 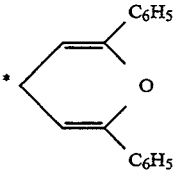 | H | II.92 |
| CN | N(CH$_2$C$_6$H$_5$)$_2$ | 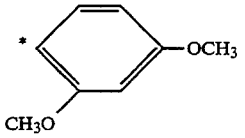 | | II.93 |
| CN | N(C$_3$H$_7$)$_2$ |  | H | II.94 |

TABLE 2-continued

| Z | Y | R⁹ | R¹⁰ | no. |
|---|---|---|---|---|
| CN | NHCOC$_{15}$H$_{31}$ | 3,5-dimethoxy-4-methoxyphenyl (2,4,5-trimethoxyphenyl) | H | II.95 |
| CN | succinimido (N-succinimidyl) | 2,3,4-trimethoxyphenyl | H | II.96 |
| CN | N(COO(C$_2$H$_4$O)$_3$CO)$_2$ | 4-N(C$_2$H$_5$)$_2$-phenyl | H | II.97 |
| CN | succinimido | 1-methylpyrrol-2-yl | H | II.98 |
| CN | NHCOOC$_2$H$_5$ | pyridyl | H | II.99 |
| CN | N(COOC$_2$H$_5$)$_2$ | julolidinyl (8-methyl-julolidin-9-yl) | H | II.100 |
| CN | N(CH$_2$C$_6$H$_5$)$_2$ | 1-methylindol-2-yl | H | II.101 |
| COOCH$_3$ | N(CH$_2$C$_6$H$_5$)(COOC$_2$H$_5$) | 4-N(CH$_3$)$_2$-3-methoxyphenyl | H | II.102 |
| CN | N(COOC$_2$H$_5$)$_2$ | thien-2-yl | H | II.103 |

TABLE 2-continued
| Z | Y | R⁹ | R¹⁰ | no. |
|---|---|----|-----|-----|
| COOC₂H₅ | 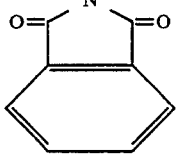 | 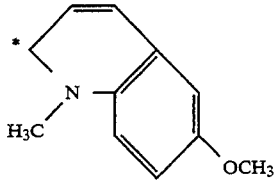 | | II.104 |
| CN | NHCOOC(CH₃)₃ | 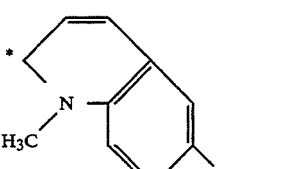 | | II.105 |
| CN | N—SO₂CH₃<br>  \<br>   CH₂C₆H₅ | 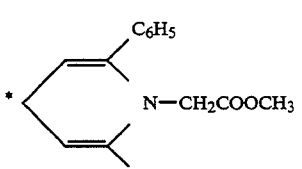 | | II.106 |
| CN | 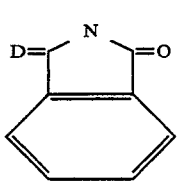 | 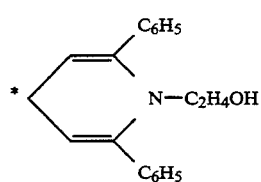 | | II.107 |
| CN | NH₂ | 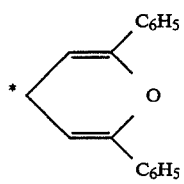 | | II.108 |
| CN | N—CH₂C₆H₅<br>  \<br>   SO₂C₆H₄CH₃ | 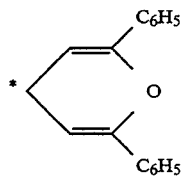 | | II.109 |
| CN | NH₂ | 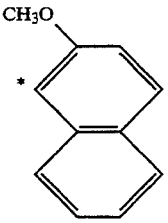 | H | II.110 |
| CN | NH₂ | 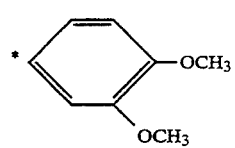 | H | II.111 |

TABLE 2-continued

| Z | Y | R⁹ | R¹⁰ | no. |
|---|---|---|---|---|
| CN | NH$_2$ | 4-N(CH$_3$)$_2$-3-(OC$_{16}$H$_{33}$)-C$_6$H$_3$-* | H | II.112 |
| CN | NH$_2$ | C$_6$H$_4$N(CH$_3$)(C$_2$H$_4$CN) | H | II.113 |
| CN | N(COOC$_2$H$_5$)(CH$_2$C$_6$H$_5$) | 2,6-(CH$_3$)$_2$-4H-pyran-4-yl* | | II.114 |
| CN | N(COOC$_4$H$_9$)$_2$ | 2,6-(CH$_3$)$_2$-4H-pyran-4-yl* | | II.115 |
| CN | N(COOCH$_2$CH(CH$_3$)$_2$)$_2$ | 2,6-(CH$_3$)$_2$-4H-pyran-4-yl* | | II.116 |
| CN | NHCOOCH$_2$CH(CH$_3$)$_2$ | 2,6-(CH$_3$)$_2$-4H-pyran-4-yl* | | II.117 |
| CN | N(COOCH$_2$CH(C$_2$H$_5$)C$_4$H$_9$)$_2$ | 2,6-(CH$_3$)$_2$-4H-pyran-4-yl* | | II.118 |
| CN | N(CH$_3$)(SO$_2$CH$_3$) | 2,6-(CH$_3$)$_2$-4H-pyran-4-yl* | | II.119 |
| CN | N(CH$_2$C$_6$H$_5$)(SO$_2$CH$_3$) | 2,6-(CH$_3$)$_2$-4H-pyran-4-yl* | | II.120 |

TABLE 2-continued

| Z | Y | R⁹ | R¹⁰ | no. |
|---|---|---|---|---|
| CN | N(—C₆H₅)(SO₂CH₃) | 2,6-dimethyl-4H-pyran-4-yl (* at 4-position, CH₃ at 2 and 6, O in ring) | | II.121 |
| CN | N(—CH₃)(SO₂C₆H₄CH₃) | 2,6-dimethyl-4H-pyran-4-yl | | II.122 |
| CN | cis-hexahydrophthalimido (cyclohexane-1,2-dicarboximide N-) | 2,6-dimethyl-4H-pyran-4-yl | | II.123 |
| CN | N(COOC₂H₅)₂ | 2,6-diphenyl-4H-pyran-4-yl | | II.124 |
| CN | N(COOC₂H₅)₂ | 2-methyl-6-[CH=CH—C₆H₄N(C₂H₅)₂]-4H-pyran-4-yl | | II.125 |
| CN | NH₂ | 2-methyl-6-[CH=CH—C₆H₄N(C₂H₅)₂]-4H-pyran-4-yl | | II.126 |
| CN | NH₂ | 8-methyl-2,3,6,7-tetrahydro-1H,5H-pyrido[3,2,1-ij]quinoline-9-yl | H | II.127 |

TABLE 2-continued
| Z | Y | R⁹ | R¹⁰ | no. |
|---|---|---|---|---|
| CN | NH₂ | 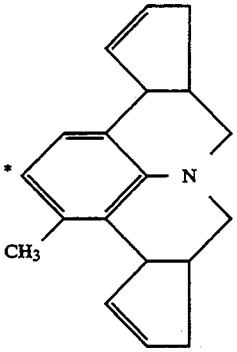 | H | II.128 |
| CN | NH₂ | 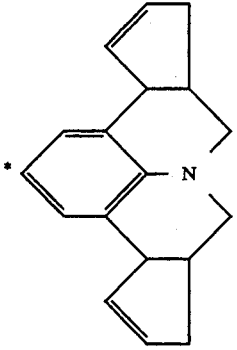 | H | II.129 |
| CN | NH₂ | 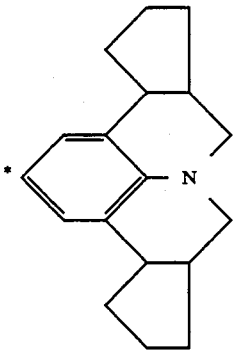 | H | II.130 |
| CN | N(COOC₂H₅)₂ | 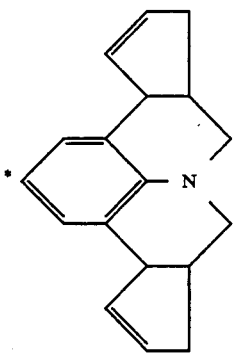 | H | II.131 |
| CN | 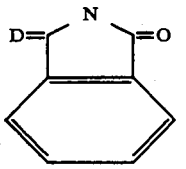 | C₆H₄N(C₂H₅)₂ | H | II.132 |

TABLE 2-continued

| Z | Y | $R^9$ | $R^{10}$ | no. |
|---|---|---|---|---|
| CN | 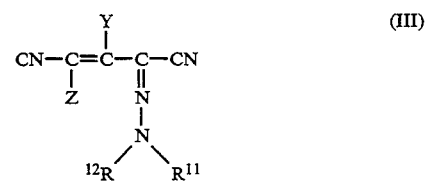 | $C_6H_4N(C_2H_5)_2$ | H | II.133 |

Dyes according to formula (II) can be obtained by addition of a malononitrile dimer to an electrophilic center $R^9$—CO—$R^{10}$ such as aldehydes, ketones, enonen, esters, etc. This addition can be carried out using a base as catalyst.

The synthesis of dyes according to formula (II) wherein Y represents $NH_2$, is described by H. Junek, B. Hornischer and H. Hamböck in Monatshefte für Chemie, Vol. 100, 1969, pages 503 to 509.

Dyes according to formula (II) wherein Y is not $NH_2$ or wherein $R^9$ and $R^{10}$ together with the C atom to which they are attached represent the necessary atoms to close a pyrone-type nucleus have not been described before. The synthesis of pyrones is described in Organic Synthesis, Vol. 46, 1966 pages 57 to 62.

Among the dyes according to formula (II) those wherein Z is CN and Y is $NR^5SR^6$ are preferred; and among those the dyes wherein $R^9$ and $R^{10}$ together with the C atom to which they are attached represent the necessary atoms to close a pyrone-type nucleus are preferred.

The dyes according to the present invention wherein X represents N—$NR^{11}R^{12}$, can be represented by the following formula (III)

$$\text{CN}-\underset{Z}{\overset{Y}{C}}=C-\underset{\underset{\underset{R^{12}}{\diagup}\overset{N}{\diagdown}R^{11}}{\overset{\|}{N}}}{C}-\text{CN} \qquad (III)$$

wherein Z, Y, $R^{11}$ and $R^{12}$ are defined as hereinbefore.

Representative examples of dyes according to formula (III) are listed below in table 3.

TABLE 3

| Z | Y | $R^{11}$ | $R^{12}$ | no. |
|---|---|---|---|---|
| CN | $NH_2$ | 3-$CH_3O_2S$, 4-$NO_2$-phenyl | H | III.1 |
| CN | $NH_2$ | 3-Cl, 4-$NO_2$-phenyl | H | III.2 |
| CN | $NH_2$ | 3-NC, 4-CN-phenyl | H | III.3 |
| CN | $NH_2$ | 3-NC, 4-$NO_2$-phenyl | H | III.4 |
| CN | $NH_2$ | 5-$CH_3$-1,3,4-thiadiazol-2-yl | H | III.5 |
| CN | $NH_2$ | 5-$C(CH_3)_3$-1,3,4-thiadiazol-2-yl | H | III.6 |
| CN | $NH_2$ | 3-$O_2N$, 4-CN-phenyl | H | III.7 |

TABLE 3-continued

| Z | Y | R[11] | R[12] | no. |
|---|---|---|---|---|
| CN | NH$_2$ |  *—C$_6$H$_4$—N(C$_2$H$_5$)$_2$ | H | III.8 |
| CN | NH$_2$ |  *—C$_6$H$_5$ | H | III.9 |
| CN | N(COOC$_2$H$_5$)$_2$ | 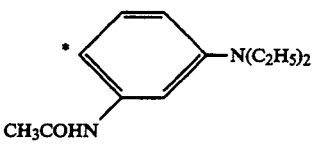 *—C$_6$H$_3$(NHCOCH$_3$)(N(C$_2$H$_5$)$_2$) | COOC$_2$H$_5$ | III.10 |
| CN | NHCOOC$_2$H$_5$ | 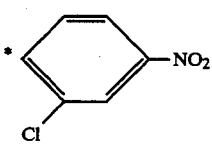 *—C$_6$H$_3$(Cl)(NO$_2$) | COOC$_2$H$_5$ | III.11 |
| CN | NHCH(CH$_3$)$_2$ | 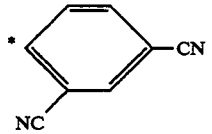 *—C$_6$H$_3$(CN)(NC) | SO$_2$C$_6$H$_5$ | III.12 |
| CN | NHCOCH$_3$ | 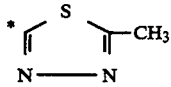 *-thiadiazole-CH$_3$ | H | III.13 |
| CN | NHCOOC$_4$H$_9$ | 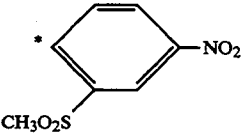 *—C$_6$H$_3$(NO$_2$)(SO$_2$CH$_3$) | COOC$_4$H$_9$ | III.14 |
| CN |  morpholino | 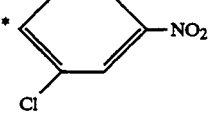 *—C$_6$H$_3$(Cl)(NO$_2$) | CH$_3$ | III.15 |
| CN |  morpholino | 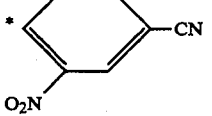 *—C$_6$H$_3$(CN)(NO$_2$) | CH$_3$ | III.16 |
| CN | NHCOC$_2$H$_5$ | 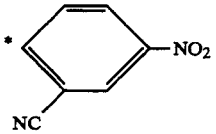 *—C$_6$H$_3$(NO$_2$)(CN) | COC$_2$H$_5$ | III.17 |
| CN | 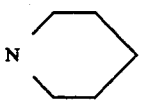 piperidino | 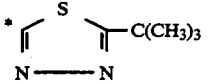 *-thiadiazole-C(CH$_3$)$_3$ | H | III.18 |

TABLE 3-continued

| Z | Y | R¹¹ | R¹² | no. |
|---|---|---|---|---|
| CN | N(COOC$_2$H$_5$)$_2$ | *-C$_6$H$_3$(Cl)-NO$_2$ | COOC$_2$H$_5$ | III.19 |
| CN | N(COOCH$_3$)$_2$ | *-C$_6$H$_3$(NC)-CN | COOCH$_3$ | III.20 |
| CN | succinimido (O=C-N-C=O) | *-C$_6$H$_4$-N(C$_2$H$_5$)$_2$ | H | III.21 |
| CN | N(COOC$_4$H$_9$)$_2$ | *-thiadiazole-CH$_3$ | COOC$_4$H$_9$ | III.22 |
| CN | NHCOCH$_3$ | *-C$_6$H$_3$(Cl)-NO$_2$ | COCH$_3$ | III.23 |
| CN | N(CH$_3$)$_2$ | *-C$_6$H$_3$(NC)-NO$_2$ | CH$_3$ | III.24 |
| CN | imidazolyl | *-C$_6$H$_3$(Cl)-NO$_2$ | H | III.25 |

Dyes according to formula (III) can be obtained by addition of a malononitrile dimer to a diazonium compound. This addition can be carried out using a base as catalyst.

The synthesis of these dyes is described in DE 2922227 and in Zeitschrift für Chemie, Vol. 29, 1989, pages 66 to 67 for reactions with malononitrile.

The dyes according to the present invention wherein X represents N—N=CR$^{13}$R$^{14}$, can be represented by the following formula (IV)

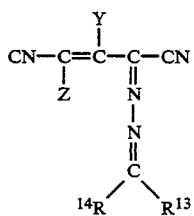

(IV)

wherein Z, Y, R$^{13}$ and R$^{14}$ are defined as hereinbefore.

In a particular type of dye according to formula (IV), R$^{13}$ and R$^{14}$ together with the C atom to which they are attached represent the necessary atoms to close a heterocyclic nucleus represented by

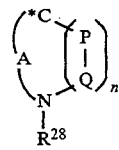

wherein n represents 0, 1 or 2;

P and Q (same or different) represent a methine group or a substituted methine group;

R$^{28}$ represents substituted or unsubstituted alkyl, substituted or unsubstituted cycloalkyl, substituted or unsubstituted aryl and A represents a bond or the necessary atoms to close a nitrogen-containing heterocyclic nucleus including said nucleus in substituted form.

Representative examples of dyes according to formula (IV) are listed below in table 4.

TABLE 4

| Z | Y | R¹³ | R¹⁴ | no. |
|---|---|---|---|---|
| CN | NH₂ | (structure: *-CH₂-C(CH₃)=CH- attached to N(C₆H₅)-phenyl ring) | | IV.1 |
| CN | (succinimide) | (same R¹³) | | IV.2 |
| CN | (methylsuccinimide) | (same R¹³) | | IV.3 |
| CN | (glutarimide) | (same R¹³) | | IV.4 |
| CN | (phthalimide) | (same R¹³) | | IV.5 |
| CN | (tetrahydrophthalimide) | (same R¹³) | | IV.6 |
| CN | N(COOC₂H₅)₂ | (same R¹³) | | IV.7 |

TABLE 4-continued

| Z | Y | R13 | R14 | no. |
|---|---|---|---|---|
| CN | N—SO$_2$CH$_3$, COOC$_2$H$_5$ | (CH$_3$ group on alkene, *CH$_2$ linked to N-phenyl indoline) | | IV.8 |
| CN | N—SO$_2$C$_6$H$_4$CH$_3$, COOC$_2$H$_5$ | (CH$_3$ group on alkene, *CH$_2$ linked to N-phenyl indoline) | | IV.9 |
| COOC$_2$H$_5$ | succinimido (N attached, O=C–CH$_2$–CH$_2$–C=O) | (CH$_3$ group on alkene, *CH$_2$ linked to N-phenyl indoline) | | IV.10 |
| COOC$_2$H$_5$ | glutarimido (N attached, O=C–CH$_2$–CH$_2$–CH$_2$–C=O) | (CH$_3$ group on alkene, *CH$_2$ linked to N-phenyl indoline) | | IV.11 |
| CN | N(COOCH$_2$C$_6$H$_5$)$_2$ | (CH$_3$ group on alkene, *CH$_2$ linked to N-phenyl indoline) | | IV.12 |
| CN | morpholino | (CH$_3$ group on alkene, *CH$_2$ linked to N-phenyl indoline) | | IV.13 |
| CN | OCH$_2$C$_6$H$_5$ | (CH$_3$ group on alkene, *CH$_2$ linked to N-phenyl indoline) | | IV.14 |

TABLE 4-continued

| Z | Y | R$^{13}$ | R$^{14}$ | no. |
|---|---|---|---|---|
| CN | NH$_2$ | (structure with C$_{15}$H$_{31}$, N-CH$_3$, phenyl) | | IV.15 |
| CN | succinimide | (structure with C$_{15}$H$_{31}$, N-CH$_3$, phenyl) | | IV.16 |
| CN | methylsuccinimide | (structure with C$_{15}$H$_{31}$, N-CH$_3$, phenyl) | | IV.17 |
| CN | glutarimide | (structure with C$_{15}$H$_{31}$, N-CH$_3$, phenyl) | | IV.18 |
| CN | phthalimide | (structure with C$_{15}$H$_{31}$, N-CH$_3$, phenyl) | | IV.19 |
| CN | hexahydrophthalimide | (structure with C$_{15}$H$_{31}$, N-CH$_3$, phenyl) | | IV.20 |
| CN | N(COOC$_2$H$_5$)$_2$ | (structure with C$_{15}$H$_{31}$, N-CH$_3$, phenyl) | | IV.21 |

TABLE 4-continued
| Z | Y | R¹³ | R¹⁴ | no. |
|---|---|---|---|---|
| CN | N—SO$_2$CH$_3$<br>COOC$_2$H$_5$ | 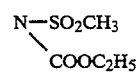 | | IV.22 |
| CN | N—SO$_2$C$_6$H$_4$CH$_3$<br>COOC$_2$H$_5$ | 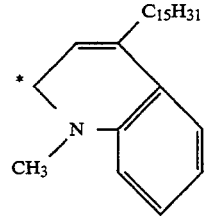 | | IV.23 |
| COOC$_2$H$_5$ | 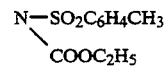 | 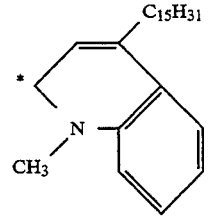 | | IV.24 |
| COOC$_2$H$_5$ | 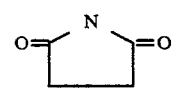 | 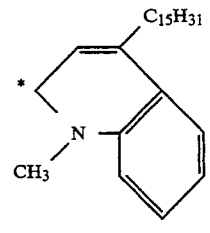 | | IV.25 |
| CN | N(COOCH$_2$C$_6$H$_5$)$_2$ | 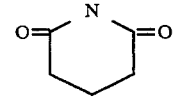 | | IV.26 |
| CN | 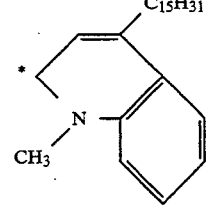 | 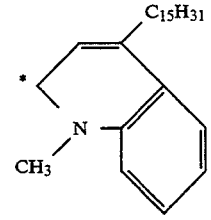 | | IV.27 |
| CN | OCH$_2$C$_6$H$_5$ | 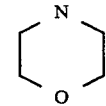 | | IV.28 |

TABLE 4-continued

| Z | Y | R$^{13}$ | R$^{14}$ | no. |
|---|---|---|---|---|
| CN | NH$_2$ | (2-(N-methylamino)-4-methoxyphenylthio)methyl | | IV.29 |
| CN | succinimido | (2-(N-methylamino)-4-methoxyphenylthio)methyl | | IV.30 |
| CN | 3-methylsuccinimido | (2-(N-methylamino)phenylthio)methyl | | IV.31 |
| CN | glutarimido | (2-(N-methylamino)phenylthio)methyl | | IV.32 |
| CN | phthalimido | (2-(N-methylamino)phenylthio)methyl | | IV.33 |
| CN | hexahydrophthalimido | (2-(N-methylamino)phenylthio)methyl | | IV.34 |
| CN | N(COOC$_2$H$_5$)$_2$ | (2-(N-methylamino)phenylthio)methyl | | IV.35 |
| CN | N(SO$_2$CH$_3$)(COOC$_2$H$_5$) | (2-(N-methylamino)phenylthio)methyl | | IV.36 |

TABLE 4-continued

| Z | Y | R¹³ | R¹⁴ | no. |
|---|---|---|---|---|
| CN | N(—SO₂C₆H₄CH₃)(COOC₂H₅) | *CH₂-(benzothiazoline, N-CH₃) | | IV.37 |
| COOC₂H₅ | succinimido | *CH₂-(benzothiazoline, N-CH₃) | | IV.38 |
| COOC₂H₅ | glutarimido | *CH₂-(benzothiazoline, N-CH₃) | | IV.39 |
| CN | N(COOCH₂C₆H₅)₂ | *CH₂-(benzothiazoline, N-CH₃) | | IV.40 |
| CN | morpholino | *CH₂-(benzothiazoline, N-CH₃) | | IV.41 |
| CN | OCH₂C₆H₅ | *CH₂-(benzothiazoline, N-CH₃) | | IV.42 |
| CN | NH₂ | *-(dihydropyridine, N—C₂H₅) | | IV.43 |
| CN | succinimido | *-(dihydropyridine, N—C₂H₅) | | IV.44 |
| CN | methylsuccinimido | *-(dihydropyridine, N—C₂H₅) | | IV.45 |
| CN | glutarimido | *-(dihydropyridine, N—C₂H₅) | | IV.46 |

TABLE 4-continued
| Z | Y | R13 | R14 | no. |
|---|---|---|---|---|
| CN | 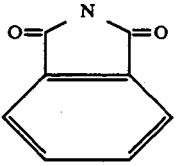 | 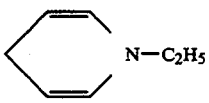 | | IV.47 |
| CN | 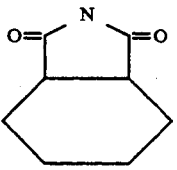 | 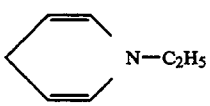 | | IV.48 |
| CN | N(COOC$_2$H$_5$)$_2$ | 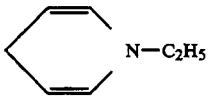 | | IV.49 |
| CN | 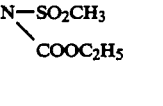 | 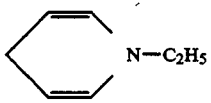 | | IV.50 |
| CN | 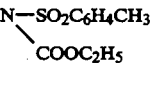 | 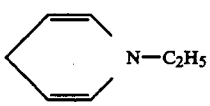 | | IV.51 |
| COOC$_2$H$_5$ | 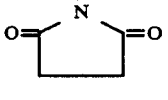 | 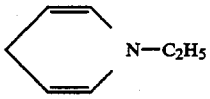 | | IV.52 |
| COOC$_2$H$_5$ | 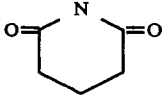 | 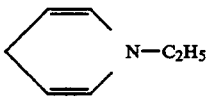 | | IV.53 |
| CN | N(COOCH$_2$C$_6$H$_5$)$_2$ | 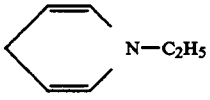 | | IV.54 |
| CN |  | 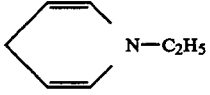 | | IV.55 |
| CN | OCH$_2$C$_6$H$_5$ | 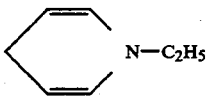 | | IV.56 |
| CN | NH$_2$ | 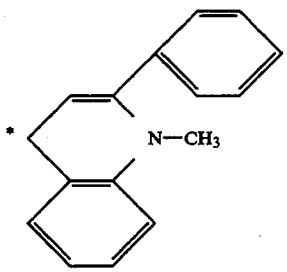 | | IV.57 |

TABLE 4-continued
| Z | Y | R¹³ | R¹⁴ | no. |
|---|---|---|---|---|
| CN | 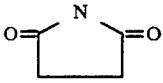 | 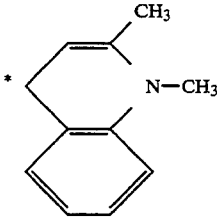 | | IV.58 |
| CN | 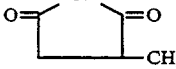 | 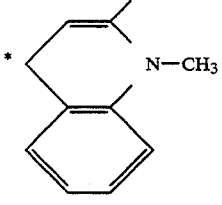 | | IV.59 |
| CN | 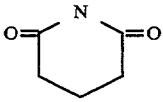 | 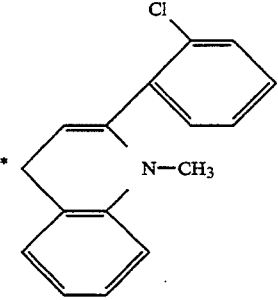 | | IV.60 |
| CN | 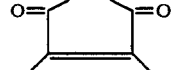 | 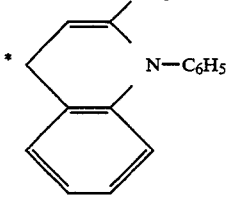 | | IV.61 |
| CN |  | 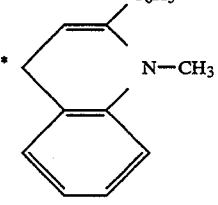 | | IV.62 |
| CN | N(COOC₂H₅)₂ | 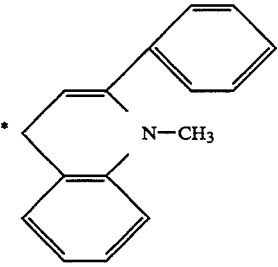 | | IV.63 |

TABLE 4-continued

| Z | Y | R¹³ | R¹⁴ | no. |
|---|---|---|---|---|
| CN | N—SO₂CH₃, COOC₂H₅ | *—CH₂—C(CH₃)=C(aryl with N—CH₃) | | IV.64 |
| CN | N—SO₂C₆H₄CH₃, COOC₂H₅ | *—CH₂—C(C₆H₅)=C(aryl with N—CH₃) | | IV.65 |
| COOC₂H₅ | succinimido (N between two C=O, 5-ring) | *—CH₂—CH=C(2-Cl-C₆H₄)(aryl with N—CH₃) | | IV.66 |
| COOC₂H₅ | glutarimido (N between two C=O, 6-ring) | *—CH₂—C(CH₃)=C(aryl with N—C₆H₅) | | IV.67 |
| CN | N(COOCH₂C₆H₅)₂ | *—CH₂—C(C₆H₅)=C(aryl with N—CH₃) | | IV.68 |
| CN | morpholino | *—CH₂—CH=C(2-Cl-C₆H₄)(aryl with N—CH₃) | | IV.69 |

TABLE 4-continued
| Z | Y | R13 | R14 | no. |
|---|---|---|---|---|
| CN | OCH2C6H5 | 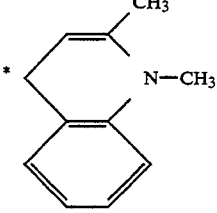 | | IV.70 |
| CN | NH2 | 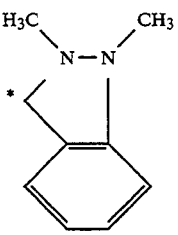 | | IV.71 |
| CN | 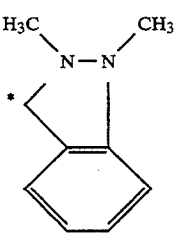 | 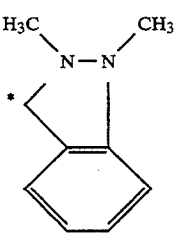 | | IV.72 |
| CN | 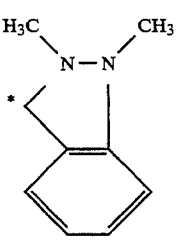 | 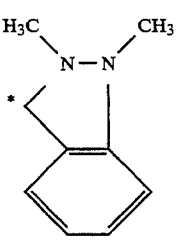 | | IV.73 |
| CN | 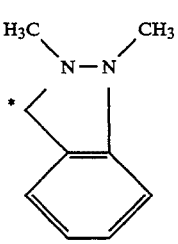 | 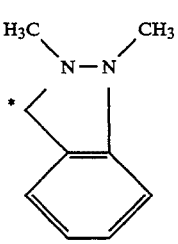 | | IV.74 |
| CN | 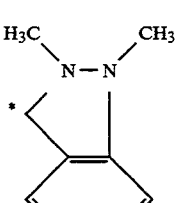 | 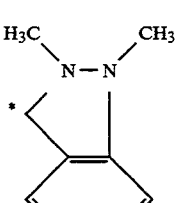 | | IV.75 |
| CN | 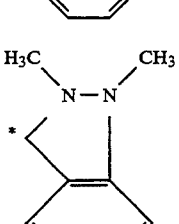 | 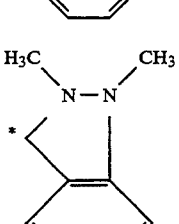 | | IV.76 |

TABLE 4-continued
| Z | Y | R[13] | R[14] | no. |
|---|---|---|---|---|
| CN | N(COOC$_2$H$_5$)$_2$ | 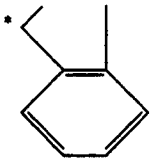 | | IV.77 |
| CN | N—SO$_2$CH$_3$<br>　　COOC$_2$H$_5$ | 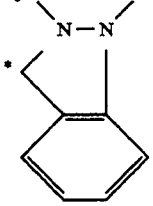 | | IV.78 |
| CN | N—SO$_2$C$_6$H$_4$CH$_3$<br>　　COOC$_2$H$_5$ | 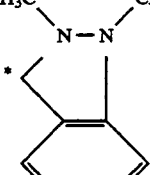 | | IV.79 |
| COOC$_2$H$_5$ | succinimide | 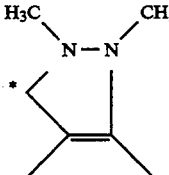 | | IV.80 |
| COOC$_2$H$_5$ | glutarimide | 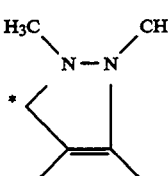 | | IV.81 |
| CN | N(COOCH$_2$C$_6$H$_5$)$_2$ | 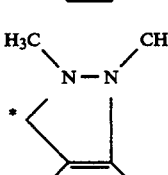 | | IV.82 |
| CN | morpholino | 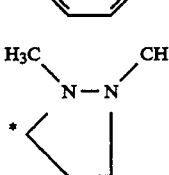 | | IV.83 |

TABLE 4-continued

| Z | Y | R¹³ | R¹⁴ | no. |
|---|---|---|---|---|
| CN | OCH₂C₆H₅ | H₃C—N—N—CH₃ with CH₂* attached to benzene ring | | IV.84 |
| CN | NH₂ | *CH₂–C(CH₃)=, attached to N-methyl acenaphthylene | | IV.85 |
| CN | succinimido (O=C–N–C=O ring) | *CH₂–C(CH₃)=, attached to N-methyl acenaphthylene | | IV.86 |
| CN | methylsuccinimido | *CH₂–C(CH₃)=, attached to N-methyl acenaphthylene | | IV.87 |
| CN | glutarimido | *CH₂–C(CH₃)=, attached to N-methyl acenaphthylene | | IV.88 |
| CN | phthalimido | *CH₂–C(CH₃)=, attached to N-methyl acenaphthylene | | IV.89 |

TABLE 4-continued

| Z | Y | R[13] | R[14] | no. |
|---|---|---|---|---|
| CN | (hexahydrophthalimide-N-yl) | CH₃-C(=CH-*)-(1-(N-methyl)naphthyl) | | IV.90 |
| CN | N(COOC₂H₅)₂ | CH₃-C(=CH-*)-(1-(N-methyl)naphthyl) | | IV.91 |
| CN | N(SO₂CH₃)(COOC₂H₅) | CH₃-C(=CH-*)-(1-(N-methyl)naphthyl) | | IV.92 |
| CN | N(SO₂C₆H₄CH₃)(COOC₂H₅) | CH₃-C(=CH-*)-(1-(N-methyl)naphthyl) | | IV.93 |
| COOC₂H₅ | (succinimide-N-yl) | CH₃-C(=CH-*)-(1-(N-methyl)naphthyl) | | IV.94 |
| COOC₂H₅ | (glutarimide-N-yl) | CH₃-C(=CH-*)-(1-(N-methyl)naphthyl) | | IV.95 |

TABLE 4-continued
| Z | Y | R[13] | R[14] | no. |
|---|---|---|---|---|
| CN | N(COOCH$_2$C$_6$H$_5$)$_2$ | 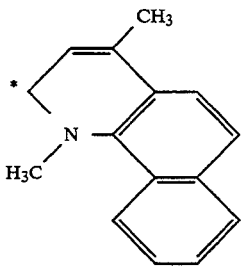 | | IV.96 |
| CN | 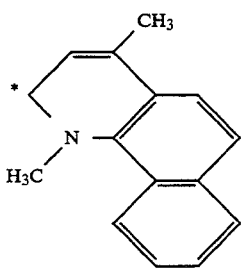 morpholine | 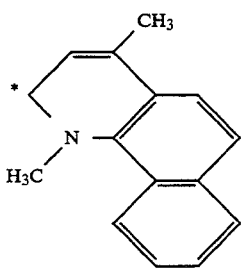 | | IV.97 |
| CN | OCH$_2$C$_6$H$_5$ | 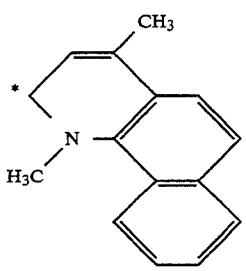 | | IV.98 |
| CN | NH$_2$ | 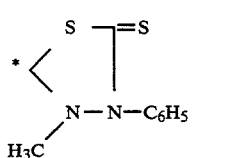 | | IV.99 |
| CN | 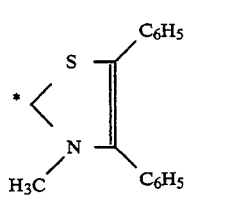 succinimide | 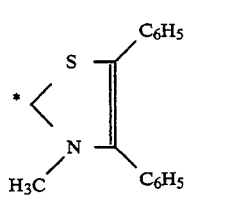 C$_6$H$_5$ / C$_6$H$_5$ | | IV.100 |
| CN | 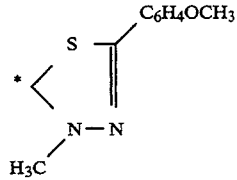 methylsuccinimide | 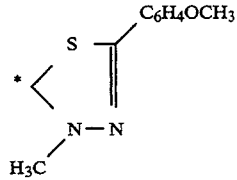 C$_6$H$_4$OCH$_3$ | | IV.101 |
| CN | 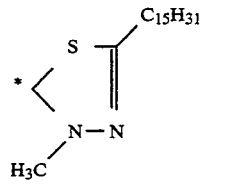 glutarimide | 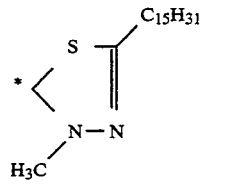 C$_{15}$H$_{31}$ | | IV.102 |

TABLE 4-continued

| Z | Y | R¹³ | R¹⁴ | no. |
|---|---|---|---|---|
| CN | phthalimido | -CH₂-S-C(=N-N(CH₃)-)-C(CH₃)₃ | | IV.103 |
| CN | hexahydrophthalimido | -CH₂-S-C(=N-N(CH₃)-)-(thiophene) | | IV.104 |
| CN | N(COOC₂H₅)₂ | -CH₂-N(CH₃)-C(=S)-(4-methylphenyl) | | IV.105 |
| CN | N(SO₂CH₃)(COOC₂H₅) | -CH₂-N(CH₃)-CH=C(S-)-COOCH₃ | | IV.106 |
| CN | N(SO₂C₆H₄CH₃)(COOC₂H₅) | -CH₂-N(CH₃)-(4-chlorophenyl)-C=CH-C₁₅H₃₁ | | IV.107 |
| COOC₂H₅ | succinimido | -CH₂-N(CH₃)-(4-octyloxyphenyl)-S- | | IV.108 |
| CN | morpholino | -CH₂-N(CH₃)-(4-methylphenyl)-C=CH-C₁₅H₃₁ | | IV.109 |

TABLE 4-continued

| Z | Y | R¹³ | R¹⁴ | no. |
|---|---|---|---|---|
| CN | OCH₂C₆H₅ | (CH₃)₂ | [structure: N-methylindoline-CH₂-] | IV.110 |
| CN | NH₂ | | [structure: CH₂-C(C₁₅H₃₁)=N-N(CH₃)-CH=] | IV.111 |

Dyes according to formula (IV) can be obtained by addition of a malononitrile dimer to a hydrazone compound in the presence of an oxidizing agent. The synthesis of hydrazone compounds is described in FR-P 1444971 and in GB-P 13016757.

Dyes according to formula (IV) have not been described before.

According to another embodiment of this invention wherein X represents N-Het with Het being a heterocyclic nucleus, the dyes correspond to general formula (V)

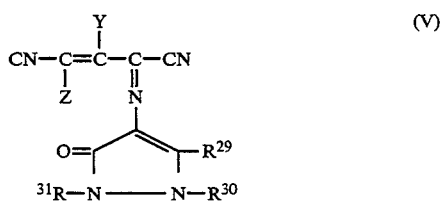

wherein

Z and Y are as defined hereinbefore;

R²⁹ represents hydrogen or any substituent e.g. substituted or unsubstituted alkyl, substituted or unsubstituted cycloalkyl, substituted or unsubstituted aryl, carboxyl esters, carboxyl amides, amino, acylamino;

R³⁰ represents hydrogen, substituted or unsubstituted alkyl, substituted or unsubstituted cycloalkyl, substituted or unsubstituted aryl or a heterocyclic residue and R³¹ represents hydrogen, substituted or unsubstituted alkyl, substituted or unsubstituted cycloalkyl, substituted or unsubstituted aryl, acyl or a heterocyclic residue.

Representative examples of dyes according to formula (V) are listed below in table 5.

TABLE 5

| Z | Y | R²⁹ | R³⁰ | R³¹ | no. |
|---|---|---|---|---|---|
| CN | NH₂ | CH₃ | CH₃ | C₆H₅ | V.1 |
| CN | [succinimido N] | CH₃ | CH₃ | C₆H₅ | V.2 |
| CN | [N with O=, =O, CH₃] | CH₃ | CH₃ | C₆H₅ | V.3 |
| CN | [glutarimido N] | CH₃ | CH₃ | C₆H₅ | V.4 |
| CN | [phthalimido-like N fused with 6-ring] | CH₃ | CH₃ | C₆H₅ | V.5 |
| CN | [imide fused cyclohexane] | CH₃ | CH₃ | C₆H₅ | V.6 |
| CN | N(COOC₂H₅)₂ | CH₃ | CH₃ | C₆H₅ | V.7 |
| CN | N(SO₂CH₃)(COOC₂H₅) | CH₃ | CH₃ | C₆H₅ | V.8 |
| CN | N(SO₂C₆H₄CH₃)(COOC₂H₅) | CH₃ | CH₃ | C₆H₅ | V.9 |
| COOC₂H₅ | [succinimido N] | CH₃ | CH₃ | C₆H₅ | V.10 |
| COOC₂H₅ | [glutarimido N] | CH₃ | CH₃ | C₆H₅ | V.11 |
| CN | N(COOCH₂C₆H₅)₂ | CH₃ | CH₃ | C₆H₅ | V.12 |

TABLE 5-continued

| Z | Y | $R^{29}$ | $R^{30}$ | $R^{31}$ | no. |
|---|---|---|---|---|---|
| CN | morpholino (N with O) | $CH_3$ | $CH_3$ | $C_6H_5$ | V.13 |
| CN | $OCH_2C_6H_5$ | $CH_3$ | $CH_3$ | $C_6H_5$ | V.14 |
| CN | $NH_2$ | $C_{13}H_{25}$ | $CH_3$ | $CH_3$ | V.15 |
| CN | succinimido | $C_{13}H_{25}$ | $CH_3$ | $CH_3$ | V.16 |
| CN | methylsuccinimido | $C_{13}H_{25}$ | $CH_3$ | $CH_3$ | V.17 |
| CN | glutarimido | $C_{13}H_{25}$ | $CH_3$ | $CH_3$ | V.18 |
| CN | phthalimido | $C_{13}H_{25}$ | $CH_3$ | $CH_3$ | V.19 |
| CN | hexahydrophthalimido | $C_{13}H_{25}$ | $CH_3$ | $CH_3$ | V.20 |
| CN | $N(COOC_2H_5)_2$ | $C_{13}H_{25}$ | $CH_3$ | $CH_3$ | V.21 |
| CN | $N(SO_2CH_3)(COOC_2H_5)$ | $C_{13}H_{25}$ | $CH_3$ | $CH_3$ | V.22 |
| CN | $N(SO_2C_6H_4CH_3)(COOC_2H_5)$ | $C_{13}H_{25}$ | $CH_3$ | $CH_3$ | V.23 |
| $COOC_2H_5$ | succinimido | $C_{13}H_{25}$ | $CH_3$ | $CH_3$ | V.24 |
| $COOC_2H_5$ | glutarimido | $C_{13}H_{25}$ | $CH_3$ | $CH_3$ | V.25 |
| CN | $N(COOCH_2C_6H_5)_2$ | $C_{13}H_{25}$ | $CH_3$ | $CH_3$ | V.26 |
| CN | morpholino | $C_{13}H_{25}$ | $CH_3$ | $CH_3$ | V.27 |
| CN | $OCH_2C_6H_5$ | $C_{13}H_{25}$ | $CH_3$ | $CH_3$ | V.28 |
| CN | $NH_2$ | $C_3H_7$ | $CH_3$ | $C_6H_5$ | V.29 |
| CN | succinimido methyl | $C_3H_7$ | $CH_3$ | $C_6H_5$ | V.30 |
| CN | $N(COOC_2H_5)_2$ | $C_3H_7$ | $CH_3$ | $C_6H_5$ | V.31 |
| CN | $N(SO_2C_6H_4CH_3)(CH_2C_6H_5)$ | $C_3H_7$ | $CH_3$ | $C_6H_5$ | V.32 |
| CN | $NH_2$ | $CH_3$ | $C_3H_7$ | $C_6H_5$ | V.33 |
| CN | methylsuccinimido | $CH_3$ | $C_3H_7$ | $C_6H_5$ | V.34 |
| CN | $N(COOC_4H_9)_2$ | $CH_3$ | $C_3H_7$ | $C_6H_5$ | V.35 |

Dyes according to formula (V) can be obtained by addition of a malononitrile dimer to an antipyrine nucleus in the presence of an oxidizing agent. Derivatization of the —$NH_2$ group is done by methods as described below in the examples. These dyes have not been described before.

The present dyes are of cyan, magenta or yellow hue.

These dyes can be used in inks e.g. for laser applications and in inkjet, in textile, in lacquers and in paints.

These dyes are particularly useful in thermal dye sublimation or diffusion transfer applications including laser-induced transfer and resistive ribbon transfer. However, they can also be used in thermal dye melt transfer.

According to a particular embodiment of this invention the present dyes are used in the dye layer of a dye-donor element for thermal dye sublimation transfer.

For improving the stability of the dyes to light, the use of a metal complex of the dye, e.g. a Ni or Co complex, is also effective.

The dye layer is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed has a thickness of about 0.2 to 5.0 μm, preferably 0.4 to 2.0 μm, and the amount ratio of dye to binder is between 9:1 and 1:3 by weight, preferably between 2:1 and 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, nitrocellulose, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic.

Particularly preferred dyes or dye mixtures for use in a dye-donor element for thermal dye sublimation are: for yellow a mixture of dye II.116 and a dye corresponding to the formula

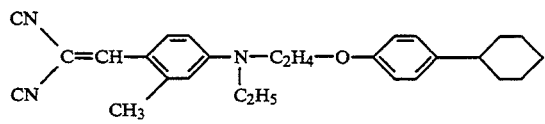

in a ratio of 1:10 to 10:1, for magenta a mixture of a dye corresponding to the formula

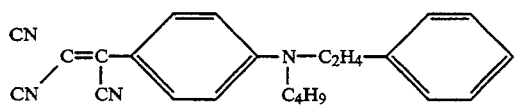

and a dye corresponding to the formula

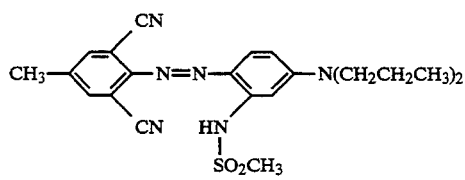

in a ratio of 1:10 to 10:1, or a mixture of a dye corresponding to the formula

and a dye corresponding to the formula

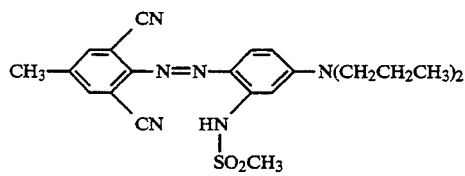

in a ratio of 1:10 to 10:1, and for cyan a mixture of dye I.134 and dye I.92 or dye I.96 in a ratio of 1:10 to 10:1. The binder that is preferably used in the dye layer is a mixture of co-styrene-acrylonitrile and co-styrene-acrylonitrile-butadieen in a ratio ranging from 0 to 100% of either of the constituents. Preferably the binder/dye ratio is between 5:1 and 1:5.

The coating layer may also contain other additives, such as curing agents, preservatives, etc., these and other ingredients being described more fully in EP 133011, EP 133012, EP 111004 and EP 279467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given Lo a support comprising polyethylene terephthalate. In general, the support has a thickness of 2 to 30 μm. The support may also be coated with an adhesive or subbing layer, if desired.

The dye layer of the dye-donor element may be coated on the support or printed thereon by a printing technique such as a gravure process.

A dye-barrier layer comprising a hydrophilic polymer may also be employed in the dye-donor element between its support and the dye layer to improve the dye transfer densities by preventing wrong-way transfer of dye towards the support. The dye barrier layer may contain any hydrophilic material which is useful for the intended purpose. In general, good results have been obtained with gelatin, polyacryl amide, polyisopropyl acrylamide, butyl methacrylate grafted gelatin, ethyl methacrylate grafted gelatin, ethyl acrylate grafted gelatin, cellulose monoacetate, methyl cellulose, polyvinyl alcohol, polyethylene imine, polyacrylic acid, a mixture of polyvinyl alcohol and polyvinyl acetate, a mixture of polyvinyl alcohol and polyacrylic acid or a mixture of cellulose monoacetate and polyacrylic acid. Suitable dye barrier layers have been described in e.g. EP 227091 and EP 228065. Certain hydrophilic polymers, for example those described in EP 227091, also have an adequate adhesion to the support and the dye layer, thus eliminating the need for a separate adhesive or subbing layer. These particular hydrophilic polymers used in a single layer in the donor element thus perform a dual function, hence are referred Lo as dye-barrier/-subbing layers.

Preferably the reverse side of the dye-donor element can be coated with a slipping layer to prevent the printing head from slicking to the dye-donor element. Such a slipping layer would comprise a lubricating material such as a surface active agent, a liquid lubricant, a solid lubricant or mixtures thereof, with or without a polymeric binder. The surface active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$-$C_{20}$ aliphatic acids. Examples of liquid lubricants include silicone oils, synthetic oils, saturated hydrocarbons and glycols. Examples of solid lubricants include various higher alcohols such as stearyl alcohol, fatty acids and fatty acid esters. Suitable slipping layers are described in e.g. EP 138483, EP 227090, U.S. Pat. Nos. 4,567,113, 4,572,860, 4,717,711. Preferably the slipping layer comprises as binder a styrene-acrylonitrile copolymer or a styrene-acrylonitrile-butadiene copolymer or a mixture hereof and as lubricant in an amount of 0.1 to 10% by weight of the binder (mixture) a polysiloxane-polyether copolymer or polytetrafluoroethylene or a mixture hereof.

The support for the receiver sheet that is used with the dye-donor element may be a transparent film of e.g. polyethylene terephthalate, a polyether sulfone, a polyimide, a cellulose ester or a polyvinyl alcohol-co-acetal. The support may also be a reflective one such as baryta-coated paper, polyethylene-coated paper or white polyester i.e. white-pigmented polyester.

To avoid poor adsorption of the transferred dye to the support of the receiver Sheet this support must be coated with a special surface, a dye-image-receiving layer, into which the dye can diffuse more readily. The dye-image-receiving layer may comprise, for example, a polycarbonate, a polyurethane, a polyester, a polyamide, polyvinyl chloride, polystyrene-co-acrylonitrile, polycaprolactone or mixtures thereof. Suitable dye-receiving layers have been described in e.g. EP 133011, EP 133012, EP 144247, EP 227094, EP 228066.

In order to improve the light resistance and other stabilities of recorded images, UV absorbers, singlet oxygen quenchers such as HALS-compounds (Hindered Amine tight Stabilizers) and/or antioxidants may be incorporated into the receiving layer.

The dye layer of the dye-donor element or the dye-image-receiving layer of the receiver sheet may also contain a releasing agent that aids in separating the dye-donor element from the dye-receiving element after transfer. The releasing agents can also be applied in a separate layer on at least part of the dye layer or of the receiving layer. For the releasing agent solid waxes, fluorine- or phosphate-containing surfactants and silicone oils are used. Suitable releasing agents are described in e.g. EP 133012, JP 85/19138, EP 227092.

The dye-donor elements according to the invention are used to form a dye transfer image. Such a process comprises placing the dye layer of the donor element in face-to-face relation with the dye-receiving layer of the receiver sheet and imagewise heating from the back of the donor element. The transfer of the dye is accomplished by heating for about several milliseconds at a temperature of 400° C.

When the process is performed for but one single color, a monochrome dye transfer image is obtained. A multicolor image can be obtained by using a donor element containing three or more primary color dyes and sequentially performing the process steps described above for each color. The above sandwich of donor element and receiver sheet is formed on three occasions during the time when heat is applied by the thermal printing head. After the first dye has been transferred, the elements are peeled apart. A second dye-donor element (or another area of the donor element with a different dye area) is then brought in register with the dye-receiving element and the process repeated. The third color and optionally further colors are obtained in the same manner.

In order to accomplish a perfect register when the process is performed for more than one color and in order to detect what color is existing at the printing portion of the donor element, detection marks are commonly provided on one surface of the donor element. Generally optically detectable marks are used that can be detected by a light source and a photo sensor; detection being done by measuring the light transmitted through the detection mark or reflected from said mark. The marks being in the form of a light-absorbing or light-reflecting coating are formed in a preassigned position on the donor element by e.g. gravure printing. The detection marks can comprise an infrared shielding compound such as carbon black. The detection mark can also comprise one of the image dyes that are used for the image formation, with the detection being in the visible range.

The receiving element can also have detection marks provided on one surface, preferably the back surface so that the receiving element can be accurately set at a desired position during transfer, whereby the image can be formed always at a correct desired position.

In addition to thermal heads, laser light, infrared flash or heated pens can be used as the heat source for supplying heat energy. Thermal printing heads that can be used to transfer dye from the dye-donor elements of the present invention to a receiver sheet are commercially available. In case laser light is used, the dye layer or another layer of the dye element has to contain a compound that absorbs the light emitted by the laser and converts it into heat, e.g. carbon black.

Alternatively, the support of the dye-donor element may be an electrically resistive ribbon consisting of, for example, a multi-layer structure of a carbon loaded polycarbonate coated with a thin aluminum film. Current is injected into the resistive ribbon by electrically adressing a print head electrode resulting in highly localized heating of the ribbon beneath the relevant electrode. The fact that in this case the heat is generated directly in the resistive ribbon and that it is thus the ribbon that gets hot leads to an inherent advantage in printing speed using the resistive ribbon/electrode head technology compared to the thermal head technology where the various elements of the thermal head get hot and must cool down before the head can move to the next printing position.

The following examples are provided to illustrate the invention in more detail without limiting, however, the scope thereof.

EXAMPLE 1

Synthesis of dye I.1

2.92 g of dye I.61, 60 ml of acetone, 6.9 g of potassium carbonate and 4.76 ml of benzylbromide were added together and the mixture was refluxed for 1 hour. The potassium carbonate was filtered and washed with dichloromethane. The filtrate was concentrated by evaporation and was dried under vacuum. 3 g of dye I.1 was obtained.

EXAMPLE 2

Synthesis of dye I.6

6.98 g of dye I.13, 50 ml of dichloromethane, 150 ml of toluene. 22.3 ml of triethylamine and 8 g of succinic anhydride were added together and were stirred for 4 hours at room temperature. The mixture was left overnight. The residue was filtered and the filtrate was diluted with 750 ml of ethylacetate. The mixture was extracted four times with 1 l of water and two times with 500 ml of saturated sodium chloride and dried over sodium sulfate. After filtration the solution was concentrated by evaporation. 3 g of dye I.6 was obtained. Dye I.6 was purified by column chromatography using as eluent dichloromethane/ethylacetate 96:4.

EXAMPLE 3

Synthesis of dye I.13

31.2 g of 3-acetamido-4-nitroso-diethylaniline and 19 g of malononitrile dimer and 360 ml of ethanol were added together and heated while stirring. Triethylamine (16.7 ml) was added. The mixture was stirred for 24 hours at 25° C. The precipitate was filtered, washed with ethanol, methanol and hexane. 33 g of dye I.13 was obtained.

EXAMPLE 4

Synthesis of dye I.22

6.98 g of dye I.13, 50 ml of dichloromethane, 150 ml of toluene, 22.3 ml of triethylamine and 11.9 g of phthalic anhydride were added together and were stirred for 10 minutes at room temperature. The reaction mixture was diluted with 1 l of ethylacetate. The mixture was extracted with 1 l of 1N hydrogen chloride, five times with 1 l of water and two times with 500 ml of saturated sodium chloride and dried over sodium sulfate. After filtration the solution was concentrated by evaporation. After purification by column chromatography (eluent dichloromethane) 7.4 g of dye I.22 was obtained.

EXAMPLE 5

Synthesis of dye I.28

2.5 g of dye I.13, 40 ml of dichloromethane and 2.9 ml of pyridine were added together at 10°–20° C. while stirring. 3.43 ml of ethylchloroformate was added dropwise and the mixture was stirred for 2 hours at room temperature. An extra amount of 0.29 ml of pyridine and 0.343 ml of ethylchloroformate was added. The mixture was stirred for hours at room temperature. 300 ml of ethylacetate was added. The mixture was extracted with 250 ml of i N hydrogen chloride, five times with 400 ml of water and two times with 250 ml of saturated sodium chloride and dried over sodium sulfate. After filtration the solution was concentrated by evaporation and dried under vacuum. After recrystallization (solvent mixture: 20 ml of methylethylketone and 60 ml of ethanol) 2.33 g of dye I.28 was obtained.

EXAMPLE 6

Synthesis of dye I.30

4 g of dye I.61, 60 ml of dichloromethane and 5.74 ml of triethylamine were added together and 3.2 ml of methanesulfonyl chloride was added dropwise hereto at 0°–10° C. After 15 minutes of stirring at room temperature an extra amount of 5.74 ml of triethylamine was added. After 1 hour of stirring at room temperature the reaction mixture was diluted with 300 ml of ethylacetate. The mixture was extracted four times with 300 ml of water and two times with 300 ml of saturated sodium chloride and dried over sodium sulfate. After filtration the solution was concentrated by evaporation and dried under vacuum. 4.5 g of dye I.30 was obtained.

EXAMPLE 7

Synthesis of dye I.37

2 g of dye I.97 was dissolved in 30 ml of dichloromethane and 3 ml pyridine were added. Subsequently 3.4 ml of ethyl chloroformate was added dropwise hereto while stirring at 5°–10° C. After 24 hours of stirring at room temperature 200 ml of dichloromethane was added to the reaction mixture and extracted with 500 ml of 0.1N hydrogen chloride and washed with water till neutral and dried on magnesium sulfate. After filtration the solution was concentrated by evaporation, recrystallized using 40 ml of ethanol and dried under vacuum. 1.3 g of dye I.37 was obtained.

EXAMPLE 8

Synthesis of dye I.61

20 g of 4-nitroso-N-diethylaniline and 18.92 g of malononitrile dimer and 240 ml of ethanol were added together and were heated while stirring. 20 drops of piperidine were added. The mixture was refluxed for 2 hours while stirring and was then left overnight at room temperature without stirring. The crystals were filtered and washed three times with 100 ml of ethanol and three times with 100 ml of n-hexane and dried under vacuum. 28.5 g of dye I.61 were obtained.

EXAMPLE 9

Synthesis of dye I.77

21.5 g of 3-methyl-4-nitroso-N-diethylaniline and 15.52 g of malononitrile dimer and 240 ml of ethanol were added together and were heated while stirring. 26 drops of piperidine were added. An extra amount of 100 ml of ethanol were added to facilitate the stirring. The mixture was refluxed for 2 hours and was then left overnight at room temperature without stirring. The crystals were filtered and washed five times with 50 ml of ethanol and three times with 100 ml of n-hexane and dried under vacuum. 30 g of dye I.32 were obtained.

2.1 g of dye I.32, 30 ml of dichloromethane and 6 ml of pyridine were added together at 0° C. While stirring 6 ml of ethylchloroformate were added dropwise. The mixture was stirred for 36 hours at room temperature. The reaction mixture was diluted with 300 ml of ethylacetate. The mixture was extracted with 250 ml of 1N hydrogen chloride, five times with 250 ml of water and two times with 250 ml of saturated sodium chloride and dried over magnesium sulfate. After filtration the solution was concentrated by evaporation and dried under vacuum. After recrystallization with ethanol (60 ml) 2.25 g of dye I.77 was obtained.

EXAMPLE 10

Synthesis of dye I.91

6 g of dye I.61, 100 ml of dichloromethane, 200 ml of toluene, 22.2 ml of triethylamine and 24.32 g of tetrachlorophthalic anhydride were added together and the mixture was stirred for 2.5 hours at room temperature. The reaction mixture was diluted with 1 l of ethylacetate. The mixture was extracted five times with 500 ml of water and two times with 250 ml of saturated sodium chloride and dried over magnesium sulfate. After filtration the solution was concentrated by evaporation and dried under vacuum to obtain pure dye I91.

EXAMPLE 11

Synthesis of dye I.97

5 g of the below identified compound and 2.8 g of malononitrile dimer were added in 100 ml of methanol. 10 g of sodium carbonate dissolved in 30 ml of water were added to this mixture while stirring. Subsequently a solution of 8.2 g of iodine in 75 ml of methanol was added very slowly (in approximately 30 minutes). After stirring for 2 hours at room temperature the precipitate was filtered and washed with water till neutral and subsequently washed with methanol. The reaction product was purified by column chromatography using dichloromethane/ethyl-acetate ( 99:1) as eluent.

EXAMPLE 12

Synthesis of dye I.106

1.3 g of dye I.129, 25 ml of acetone, 4.9 g of potassium carbonate and 5.8 ml of benzylbromide were added together and were refluxed while stirring for 8 hours. Potassium carbonate was filtered and the filtrate was concentrated under reduced pressure. The residual oil was purified by column chromatography. 1.1 g of dye I.106 was obtained.

EXAMPLE 13

Synthesis of dye I.116

1 g of dye I.76 (prepared analogously to dye I.6) was dissolved in 5 ml of morpholine at 25° C. The solution was stirred for 30 minutes and thereafter poured into 40 ml of water. The precipitate was filtered, washed with water and purified by column chromatography (eluent dichloromethane/ethylacetate 95:5) to obtain 0.9 g of dye I.116.

EXAMPLE 14

Synthesis of dye I.126

4.5 g of dye I.30, 60 ml of dichloromethane and 2.95 ml of pyridine were added together and 3.48 ml of ethylchloroformate were added dropwise hereto at 0° C. After 4 hours of stirring at room temperature the reaction mixture was diluted with 500 ml of ethylacetate. The mixture was extracted with 500 ml of 0.1N hydrogen chloride, with water till neutral end with 500 ml of saturated sodium chloride and dried over magnesium sulfate. After filtration the solution was concentrated by evaporation to yield 3.8 g of dye I.126. After purification by column chromatography (eluent dichloromethane) 1 g of pure dye I.126 was obtained.

EXAMPLE 15

Synthesis of dye I.127

5 g of dye I.32, 80 ml of dichloromethane, 160 ml of toluene, 17.7 ml of triethylamine and 19.4 g of phthalic anhydride were added together and the mixture was stirred for 24 hours at room temperature. The mixture was thereafter left over-weekend in the refrigerator. The reaction mixture was diluted with 750 ml of ethylacetate. The mixture was extracted six times with 500 ml of water and two times with 250 ml of saturated sodium chloride and dried over sodium sulfate. After filtration the solution was concentrated by evaporation and dried under vacuum. After column chromatography 3 g of pure dye I.127 was obtained.

EXAMPLE 16

Synthesis of dye I.128

5 g of dye I.32, 80 ml of dichloromethane, 160 ml of toluene, 17.7 ml of triethylamine and 13.1 g of succinic anhydride were added together and the mixture was left overnight at room temperature while stirring and was thereafter left over-weekend in the refrigerator. The reaction mixture was diluted with 750 ml of ethylacetate. The mixture was extracted six times with 500 ml of water and two times with 250 ml of saturated sodium chloride and dried over sodium sulfate. After filtration the solution was concentrated by evaporation and dried under vacuum. 4.5 g of dye I.128 was obtained.

EXAMPLE 17

Synthesis of dye I.129

2.0 g of dye I.61 were dissolved in 30 ml of dichloromethane. At 0° C. 2.9 ml of triethylamine were added, followed by 2 ml of ethylchloroformate. The reaction mixture was stirred for 30 minutes at room temperature. 250 ml of ethylacetate were added and subsequently the mixture was washed with 1N hydrogen chloride (200 ml), water (3×500 ml) and brine (300 ml). The organic layer was dried over sodium sulfate, filtered and concentrated under reduced pressure to obtain 2.1 g of dye I.129.

EXAMPLE 18

Synthesis of dye II.11

2.3 g of dye II.23 was dissolved in 23 ml of dimethylsulfoxide and 0.31 g of potassium cyanide was added. The reaction mixture was stirred for 1 hour at room temperature. Subsequently 1.2 g of iodine were added. The reaction mixture was poured out into water and extracted with dichloromethane. The organic phase was dried over sodium sulfate and concentrated by evaporation. The reaction product was purified by column chromatography. 0.65 g of dye II.134 was obtained.

EXAMPLE 19

Synthesis of dye II.13

2 g of dye II.75, 80 ml of toluene and 40 ml of dichloromethane were added together while stirring. 1.3 g of triethylamine and 6.7 g of succinic anhydride were added. The mixture was stirred for 24 hours. Thereafter the mixture was diluted with ethylacetate, washed with 1N hydrogen chloride, with saturated sodium hydrogen carbonate and with saturated sodium chloride and dried over sodium sulfate. The mixture was concentrated by evaporation and thereafter crystallized from ethanol. 1.2 g of dye II.13 were obtained.

EXAMPLE 20

Synthesis of dye II.15

2 g of dye I.75, 50 ml of dichloromethane and 7.25 ml of pyridine were stirred at 0° C. 9.5 g of ethylchloroformate were added dropwise. The mixture was stirred for 30 minutes. Thereafter the mixture was diluted with dichloromethane, washed twice with 1N hydrogen chloride, four times with saturated sodium chloride, once with saturated sodium hydrogen carbonate, twice with saturated sodium chloride. The organic phase was dried over magnesium sulfate. The organic phase was concentrated by evaporation and thereafter crystallized from ethanol. 1.5 g of dye II.15 were obtained.

EXAMPLE 21

Synthesis of dye II.23

5 g of dye II.8 was dissolved in 100 ml of dichloromethane and 5.52 g of methyl succinic anhydride were added. At room temperature 7.76 g of triethylamine were added slowly. The mixture was stirred for 15 minutes. The reaction product was purified by column chromatography using dichloromethane as eluent. 5.5 g of dye II.23 were obtained.

EXAMPLE 22
Synthesis of dye II.51

1 g of dye II.132 was dissolved in 10 ml of dimethylsulfoxide and 0.15 g of potassium cyanide was added hereto. The mixture was stirred for 20 minutes at room temperature. Subsequently 0.6 g of iodine was added and the mixture was stirred for another 20 minutes at room temperature. The mixture was poured out into 100 ml of dichloromethane and washed with a saturated sodium chloride solution. The organic phase was dried over sodium sulfate and concentrated by evaporation. The reaction product was boiled in 20 ml of methanol, cooled and subjected to ultrasonic treatment for 5 minutes. The precipitate was filtered and washed with methanol. 0.4 g of dye II.51 was obtained.

EXAMPLE 23
Synthesis of dye II.75

5 g of 2,6-dimethyl-4H-pyran-4-one, 5.325 g of malononitrile dimer and 50 ml of acetic anhydride were heated to 120° C. for 30 minutes. The mixture was left overnight. Thereafter the precipitate was filtered, washed with water and dried at 50° C. 7.3 g of dye II.75 were obtained.

EXAMPLE 24
Synthesis of dye II.92

3 g of dye II.130 was dissolved in 50 ml of dichloromethane and 3.1 ml of pyridine. The reaction mixture was cooled and 3.6 ml of ethylchloroformate were added dropwise. The mixture was stirred at room temperature for 1 hour. Subsequently the reaction mixture was extracted with ethylacetate and 1N hydrogen chloride, washed neutral, dried and concentrated by evaporation. The reaction product was purified by recrystallisation from ethanol.

EXAMPLE 25
Synthesis of dye II.108

5 g of 2,6-diphenyl-4H-pyran-4-one, 2.7 g of malononitrile dimer and 50 ml of acetic anhydride were heated to 120° C. while stirring. After 30 minutes the mixture was cooled to room temperature. The precipitate was filtered, washed with water and methanol and dried at 50° C. After purification by crystallization from ethanol 4.4 g of dye II.108 were obtained.

EXAMPLE 26
Synthesis of dye II.116

50 g of dye II.75 was dissolved in 500 ml of dichloromethane and stirred at room temperature. 109 ml of i-butylchloroformate were added slowly. The mixture was stirred at room temperature and 68 ml of dry pyridine were added dropwise in approximately 15 minutes. The temperature increased to 42° C. After stirring for 30 minutes dichloromethane was evaporated. The reaction product was recrystallized using 400 ml of ethanol and 200 ml of water and was left overnight in the refrigerator. The crystals were filtered, washed twice with a mixture of 50 ml of water and 75 ml of ethanol and twice with 125 ml of water, and dried at 50° C. 62.6 g of dye II.116 were obtained.

EXAMPLE 27
Synthesis of dye II.128

To 15 g of the below identified compound in 100 ml of ethanol was added 8.76 g of malononitrile dimer. Three drops of piperidine were added and the mixture was refluxed for 3 hours. The precipitate was filtered, washed with ethanol and dried. 18.7 g of dye II.128 was obtained.

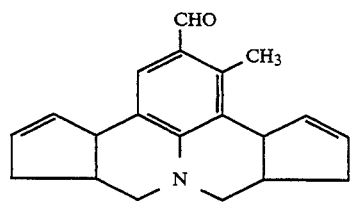

EXAMPLE 28
Synthesis of dye II.130

10 g of the below identified compound, 6 g of malononitrile dimer, 60 ml of ethanol and 3 drops of piperidine were added together and were refluxed for 4 hours. The mixture was left overnight to crystallize. The crystals were filtered, washed with ethanol and dried. 7.1 g of dye II.130 was obtained.

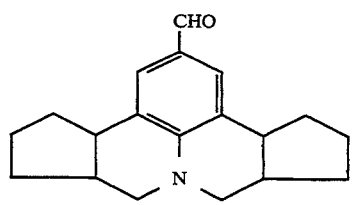

EXAMPLE 29
Synthesis of dye II.132

5 g of dye II.7 was dissolved in 125 ml of toluene and 40 ml of dichloromethane. 19.2 ml of triethylamine and 10 g of phthalic anhydride were added. The mixture was stirred at room temperature for 1 hour. Thereafter the mixture was diluted with ethylacetate and washed with a 1N hydrogen chloride solution, water and a saturated sodium chloride solution. The mixture was concentrated by evaporation and thereafter purified by column chromatography using dichloromethane as eluent. 5.4 g of dye II.132 were obtained.

EXAMPLE 30
Synthesis of dye III.8

3 g of malononitrile dimer and 20 ml of methanol were stirred at 0°–5° C. 5.3 g of p-diethylaminophenyl diazonium tetrafluorobromide salt dissolved in 20 ml of methanol was added dropwise. Thereafter 40 g of ice were added and a solution of 6 g of sodium acetate and 1 g of sodium hydroxide in 100 ml of water was added dropwise. The mixture was stirred for 1 h. The precipitate was filtered, washed with water and dried at 50° C. 5.8 g of dye III.8 were obtained.

EXAMPLE 31

Synthesis of dye IV.1

6 g of malononitrile dimer, 20 g of the below identified compound and 400 ml of methanol were added together while stirring.

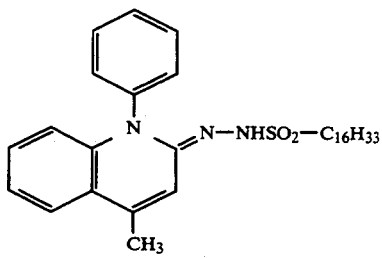

16 g of sodium carbonate dissolved in 100 ml of water was added dropwise and thereafter a solution of 9.4 g iodine in 120 ml of methanol was added dropwise. The mixture was stirred for 30 minutes. The precipitate was filtered, washed with water and dried at 50° C. After crystallization from ethanol 8.7 g of dye IV.1 were obtained.

EXAMPLE 32

Synthesis of dye IV.2

2 g of dye IV.1, together with 80 ml of toluene and 40 ml of dichloromethane were stirred at room temperature. 0.8 g of triethylamine and 4.25 g of succinic anhydride were added. The mixture was left over weekend and then a further amount of 6 ml of triethylamine was added. The mixture was stirred overnight and was thereafter diluted with dichloromethane. The reaction product was washed with 1N hydrogen chloride, with water, with saturated sodium hydrogen carbonate and with saturated sodium chloride. Then the reaction product was dried over sodium sulfate and concentrated by evaporation. After crystallization from ethanol 1.6 g of dye IV.2 were obtained.

EXAMPLE 33

Synthesis of dye IV.7

2 g of dye IV.1 were dissolved in 50 ml of dichloromethane and the solution was stirred at 0° C. After adding 4.3 ml of pyridine, 5.76 g of ethylchloroformate was added dropwise. After stirring for 30 minutes a further amount of 2.88 g of ethylchloroformate was added. Thereafter the mixture was diluted with dichloromethane, washed twice with 1N hydrogen chloride, once with saturated sodium chloride, with saturated sodium hydrogen carbonate and with saturated sodium chloride. The reaction product was dried over magnesium sulfate and concentrated by evaporation. After crystallization from ethanol 1.6 g of dye IV.7 were obtained.

EXAMPLE 34

Synthesis of dye IV.15

2.65 g of malononitrile dimer, 10 g of the below identified compound and 175 ml of methanol were added together at room temperature while stirring.

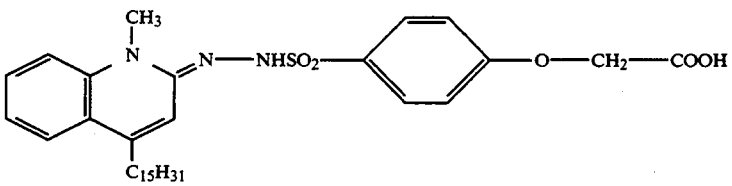

7 g of sodium carbonate dissolved in 45 ml of water was added dropwise while stirring and thereafter a solution of 4.25 g iodine in 55 ml of methanol was added dropwise. The mixture was stirred for 1 h. The precipitate was filtered, washed with methanol and water and dried at 50° C. After crystallization from acetone 4 g of dye IV.15 were obtained.

EXAMPLE 35

Synthesis of dye IV.21

3 g of dye IV.15, 30 ml of dichloromethane and 9.5 ml of pyridine were added together and stirred on an ice bath. 178 ml of ethylchloroformate was added dropwise. After stirring and check for completion of the reaction by thin layer chromatography (dichloromethane/methanol 98:2) the mixture was diluted with dichloromethane, washed with a 1N hydrogen chloride solution, with a saturated sodium chloride solution, dried over magnesium sulfate and concentrated by evaporation. After recrystallization from ethanol (80 ml) 2.4 g of dye IV.21 were obtained.

EXAMPLE 36

Synthesis of dye IV.63

4 g of dye IV.57 (synthesized analogous to dye IV.15), 40 ml of dichloromethane and 17 ml of pyridine were added together and stirred on an ice bath. 15.2 ml of ethylchloroformate was added dropwise. After stirring for 1 hour and check for completion of the reaction by thin layer chromatography (dichloromethane/methanol 98:2) the mixture was diluted with ethyl acetate, washed with a 1N hydrogen chloride solution, with water, dried over magnesium sulfate and concentrated by evaporation. After recrystallization from ethanol (60 ml) 1.0 g of dye IV.63 were obtained.

EXAMPLE 37

Synthesis of dye V.15

13 g of malononitrile dimer, 27 g of the below identified compound and 400 ml methanol were stirred.

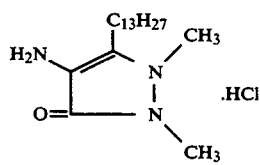

32 g of sodium carbonate dissolved in 200 ml of water was added dropwise and thereafter a solution of 38.5 g iodine in 430 ml of methanol was added dropwise. The mixture was stirred for 1 h. The precipitate was filtered, washed with methanol and water and dried. 19.2 g of dye V.15 were obtained.

EXAMPLE 38

The absorption maxima ($\lambda_{max}$) and molar extinction coefficients ($\epsilon$) of the dyes identified below were determined in methanol. The results are listed in table 6.

TABLE 6

| dye | $\lambda_{max}$ (nm) | $\epsilon$ (mol$^{-1}$ cm$^{-1}$ l) |
|---|---|---|
| I.6 | 638 | 82852 |
| I.8 | 611 | 67292 |
| I.13 | 534 | 55393 |
| I.16 | 620 | 74730 |
| I.19 | 610 | 52681 |
| I.20 | 625 | 68243 |
| I.22 | 638 | 57000 |
| I.25 | 537 | 43390 |
| I.26 | 526 | 47360 |
| I.28 | 638 | 86415 |
| I.31 | 533 | 43119 |
| I.35 | 604 | 48120 |
| I.36 | 638 | 83324 |
| I.37 | 653 | 83006 |
| I.42 | 526 | 38747 |
| I.46 | 537 | 34182 |
| I.49 | 521 | 28876 |
| I.51 | 515 | 39010 |
| I.52 | 655 | 76020 |
| I.61 | 523 | 46370 |
| I.62 | 538 | 45847 |
| I.64 | 419 | 34033 |
| I.65 | 614 | 67805 |
| I.70 | 525 | 30294 |
| I.76 | 624 | 66000 |
| I.77 | 614 | 63934 |
| I.82 | 505 | 28930 |
| I.85 | 527 | 47078 |
| I.91 | 628 | 64428 |
| I.92 | 637 | 82295 |
| I.93 | 638 | 80823 |
| I.94 | 638 | 89608 |
| I.95 | 638 | 89591 |
| I.96 | 638 | 91145 |
| I.97 | 552 | 42137 |
| I.103 | 584 | 34034 |
| I.106 | 602 | 60817 |
| I.107 | 638 | 85481 |
| I.108 | 535 | 54167 |
| I.109 | 620 | 75652 |
| I.111 | 638 | 80665 |
| I.114 | 591 | 46578 |
| I.115 | 629 | 25435 |
| I.116 | 515 | 43006 |
| I.117 | 639 | 106020 |
| I.121 | 515 | 42733 |
| I.122 | 531 | 56105 |
| I.124 | 623 | 62536 |
| I.125 | 610 | 81994 |
| I.126 | 626 | 67818 |
| I.127 | 617 | 31915 |
| I.128 | 635 | 57250 |
| I.134 | 638 | 91311 |
| I.136 | 642 | 65027 |
| I.138 | 638 | 63883 |
| I.140 | 527 | 47533 |
| I.141 | 534 | 57416 |
| I.142 | 638 | 94156 |
| II.4 | 388 | 28905 |
| II.5 | 551 | 68237 |
| II.6 | 434 | 36557 |
| II.7 | 431 | 27981 |
| II.9 | 484 | 40842 |
| II.11 | 644 | 31974 |
| II.13 | 457 | 28893 |
| II.15 | 451 | 34780 |
| II.17 | 340 | 18857 |
| II.22 | 453 | 28999 |
| II.23 | 573 | 70563 |

TABLE 6-continued

| dye | $\lambda_{max}$ (nm) | $\epsilon$ (mol$^{-1}$ cm$^{-1}$ l) |
|---|---|---|
| II.24 | 340 | 23529 |
| II.26 | 547 | 73658 |
| II.27 | 452 | 27983 |
| II.30 | 405 | 36428 |
| II.34 | 525 | 18874 |
| II.35 | 643 | 23423 |
| II.39 | 500 | 46197 |
| II.45 | 548 | 56461 |
| II.51 | 620 | 34074 |
| II.52 | 525 | 10506 |
| II.59 | 523 | 39797 |
| II.61 | 529 | 38191 |
| II.63 | 345 | 18782 |
| II.65 | 541 | 51855 |
| II.67 | 463 | 34925 |
| II.70 | 509 | 22013 |
| II.71 | 396 | 28132 |
| II.75 | 361 | 18818 |
| II.77 | 328 | 17010 |
| II.87 | 435 | 26971 |
| II.90 | 408 | 23311 |
| II.91 | 503 | 23117 |
| II.92 | 577 | 63729 |
| II.93 | 407 | 21138 |
| II.100 | 606 | 62890 |
| II.103 | 337 | 22699 |
| II.108 | 394 | 22645 |
| II.110 | 385 | |
| II.111 | 362 | 21082 |
| II.112 | 451 | 42453 |
| II.113 | 419 | 34033 |
| II.115 | 452 | 29855 |
| II.116 | 453 | 31041 |
| II.117 | 421 | 19565 |
| II.118 | 454 | 30400 |
| II.123 | 457 | 27925 |
| II.124 | 484 | 32813 |
| II.127 | 569 | 26224 |
| II.128 | 458 | 23755 |
| II.129 | 443 | 30749 |
| II.130 | 460 | 33180 |
| II.131 | 477 | 35528 |
| II.132 | 549 | 52926 |
| II.13 | 551 | 48816 |
| III.8 | 250 | 43096 |
| III.9 | 247 | 33100 |
| IV.1 | 470 | 35187 |
| IV.2 | 543 | 55170 |
| IV.7 | 541 | 56566 |
| IV.21 | 513 | 32357 |
| IV.30 | 533 | 62454 |
| IV.63 | 579 | 55434 |
| V.1 | 437 | 2506 |

EXAMPLE 39

A dye-donor element for use according to thermal dye sublimation transfer was prepared as follows:

A solution of dye as identified in Table 7 and binder in 10 ml of solvent was prepared (the nature of the binder and the solvent is identified below). From this solution a layer having a wet thickness of 100 μm was coated on 6 μpm thick polyethylene terephthalate film. The resulting layer was dried by evaporation of the solvent.

A commercially available Hitachi material type VY S100A was used as receiving element.

The dye-donor element was printed in combination with the receiving element in a Hitachi color video printer VY-100A.

The receiver sheet was separated from the dye-donor element and the maximum color density of the recorded dye image on the receiving sheet ($D_{max}$) was measured by means of a Macbeth densitometer RD919 in Status A mode.

The stability to light of the dyes was tested as follows. The receiver sheet carrying transferred dye was divided into 3 strips. The first strip was exposed for 5 hours, the second for 15 hours and the third for 30 hours to white light and ultraviolet radiation in a Xenotest (trade name) type 50 apparatus of Hanau Quartzlampen GmbH, Hanau, W. Germany. The density was measured again and the loss of density in percent was derived.

These experiments were repeated for each of the dye/binder combinations identified in table 7.

In table 7 B1 stands for co-vinylbutyral-vinylacetal-vinyl alcohol, B2 for nitrocellulose with a nitrogen content between 6.75% and 14% by weight, B3 for cellulose acetate butyrate having an acetyl content of 29.5% and a butyryl content of 17%, B4 for co-styrene-acrylonitrile, S1 for methyl ethyl ketone, S2 for tetrahydrofuran, S3 for dichloromethane.

TABLE 7

| dye | binder | mg dye/ mg binder | solvent | $D_{max}$ | % density loss 5 h | 15 h | 30 h |
|---|---|---|---|---|---|---|---|
| I.6 | B3 | 50/50 | S1 | 230(a) | 3 | 10 | 16 |
| I.6 | B2 | 50/20 | S1 | 264 | 1 | 1 | 6 |
| I.8 | B3 | 50/50 | S1 | 133 | 15 | 42 | 73 |
| I.8 | B2 | 50/20 | S1 | 169 | 21 | 49 | 80 |
| I.13 | B3 | 40/50 | S1 | 198 | 86 | | |
| I.13 | B2 | 50/20 | S1 | 219 | 89 | | |
| I.16 | B3 | 50/50 | S1 | 263 | 9 | 22 | 61 |
| I.16 | B3 | 50/50 | S1 | 263 | 9 | 22 | 61 |
| I.16 | B2 | 50/20 | S1 | 262 | 2 | 8 | 23 |
| I.19 | B3 | 50/50 | S1 | 143 | 9 | 31 | 77 |
| I.19 | B2 | 50/20 | S1 | 173 | 5 | 31 | 76 |
| I.20 | B3 | 50/50 | S1 | 175 | 21 | 61 | |
| I.20 | B2 | 50/20 | S1 | 204 | 11 | 59 | |
| I.25 | B3 | 50/50 | S1 | 202 | 83 | | |
| I.25 | B2 | 50/20 | S1 | 239 | 86 | | |
| I.26 | B3 | 50/50 | S1 | 261 | 4 | 54 | 85 |
| I.26 | B2 | 50/20 | S1 | 239 | | | |
| I.26 | B2 | 50/20 | S1 | 239 | 4 | 54 | 85 |
| I.28 | B3 | 50/50 | S1 | 264 | 9 | 13 | 27 |
| I.28 | B2 | 50/20 | S1 | 234 | | | |
| I.28 | B2 | 30/20 | S1 | 258 | 3 | 9 | 24 |
| I.35 | B3 | 50/50 | S1 | 182 | 13 | 57 | |
| I.35 | B2 | 50/20 | S1 | 205 | 9 | 50 | |
| I.36 | B3 | 50/50 | S1 | 139 | 3 | 16 | 26 |
| I.36 | B2 | 50/20 | S1 | 241 | 38 | 25 | 37 |
| I.37 | B3 | 50/50 | S1 | 201 | 36 | 85 | |
| I.37 | B2 | 50/20 | S1 | 212 | 54 | 87 | |
| I.42 | B2 | 50/50 | S2 | 214 | 33 | 77 | |
| I.42 | B2 | 50/20 | S1 | 242 | 14 | 60 | |
| I.42 | B2 | 50/20 | S1 | 242 | 14 | 60 | |
| I.42 | B2 | 50/50 | S2 | 214 | 33 | 77 | |
| I.46 | B3 | 50/50 | S1 | 240 | 86 | | |
| I.46 | B2 | 50/20 | S1 | 249 | 88 | | |
| I.52 | B3 | 50/50 | S1 | 140 | 48 | | |
| I.52 | B2 | 50/20 | S1 | 151 | 50 | | |
| I.61 | B4 | 50/50 | S1 | 211 | 21 | 80 | 89 |
| I.62 | B3 | 50/50 | S1 | 223 | 90 | | |
| I.62 | B2 | 50/20 | S1 | 251 | 90 | | |
| I.65 | B3 | 50/50 | S1 | 205 | 41 | 63 | |
| I.65 | B2 | 50/20 | S1 | 239 | 54 | | |
| I.70 | B2 | 50/20 | S1 | 222 | 3 | 62 | 92 |
| I.70 | B3 | 50/50 | S1 | 237 | 13 | 80 | 92 |
| I.76 | B3 | 50/50 | S1 | 257 | 6 | 9 | |
| I.76 | B3 | 50/50 | S1 | 257 | 2 | 7 | 12 |
| I.76 | B2 | 50/20 | S1 | 256 | 2 | 7 | 12 |
| I.76 | B3 | 50/50 | S1 | 198 | | | |
| I.76 | B2 | 50/20 | S1 | 190 | | | |
| I.77 | B3 | 50/50 | S1 | 203 | 2 | 3 | 51 |
| I.77 | B2 | 50/20 | S1 | 253 | 12 | 19 | 32 |
| I.85 | B2 | 25/20 | S1 | 269 | 18 | 79 | |
| I.85 | B2 | 50/20 | S1 | 262 | 8 | 53 | |
| I.85 | B2 | 50/20 | S1 | 275 | 10 | 70 | |
| I.91 | B3 | 50/50 | S1 | 211 | 17 | 52 | |
| I.91 | B2 | 50/20 | S1 | 213 | 14 | 63 | |
| I.92 | B3 | 50/50 | S1 | 237 | 8 | 23 | 60 |
| I.92 | B2 | 50/20 | S1 | 248 | 2 | 9 | 19 |
| I.93 | B3 | 50/50 | S1 | 197 | 8 | 19 | 68 |
| I.93 | B2 | 50/20 | S1 | 234 | 1 | 3 | 66 |
| I.94 | B3 | 50/50 | S1 | 225 | 4 | 5 | 13 |
| I.94 | B2 | 50/20 | S1 | 229 | 1 | 0 | 2 |
| I.95 | B3 | 50/50 | S1 | 233 | 4 | 9 | 17 |
| I.95 | B2 | 50/20 | S1 | 256 | 5 | 5 | 8 |
| I.96 | B3 | 50/50 | S1 | 229 | 9 | 28 | 58 |
| I.96 | B2 | 50/20 | S1 | 251 | 3 | 4 | 19 |
| I.106 | B3 | 50/50 | S1 | 225 | 74 | 90 | |
| I.106 | B2 | 50/20 | S1 | 244 | 68 | 91 | |
| I.106 | B2 | 30/20 | S1 | 189 | 70 | 89 | |
| I.107 | B3 | 50/50 | S1 | 177 | 1 | 2 | 24 |
| I.107 | B2 | 50/20 | S1 | 212 | 1 | 7 | 19 |
| I.108 | B3 | 50/50 | S1 | 223 | 17 | 56 | |
| I.108 | B2 | 50/20 | S1 | 229 | 16 | 54 | |
| I.109 | B3 | 50/50 | S1 | 227 | 14 | 94 | 78 |
| I.109 | B2 | 50/20 | S1 | 247 | 2 | 62 | 78 |
| I.111 | B3 | 50/50 | S1 | 181 | 2 | 3 | 12 |
| I.111 | B2 | 50/20 | S1 | 192 | 2 | 2 | 1 |
| I.115 | B3 | 50/50 | S1 | 196 | 30 | 81 | |
| I.115 | B2 | 50/20 | S1 | 222 | 54 | | |
| I.116 | B3 | 50/50 | S1 | 236 | 30 | 22 | 55 |
| I.116 | B2 | 50/20 | S1 | 240 | 2 | 18 | 53 |
| I.117 | B3 | 50/50 | S1 | 208 | 5 | 12 | 25 |
| I.117 | B2 | 50/20 | S1 | 235 | 3 | 8 | 16 |
| I.121 | B3 | 50/50 | S1 | 261 | 15 | 47 | 71 |
| I.121 | B2 | 50/20 | S1 | 274 | 12 | 47 | 78 |
| I.121 | B2 | 50/20 | S1 | 274 | 12 | 47 | 78 |
| I.122 | B2 | 50/20 | S2 | 158 | 4 | 82 | |
| I.122 | B2 | 50/20 | S2 | 158 | 4 | | |
| I.123 | B4 | 40/50 | S1 | 269 | 25 | 69 | |
| I.124 | B3 | 50/50 | S1 | 233 | 3 | 20 | 60 |
| I.124 | B2 | 50/20 | S1 | 198(a) | 10 | 23 | 61 |
| I.124 | B3 | 50/50 | S1 | 233 | 3 | 20 | 60 |
| I.125 | B3 | 50/50 | S1 | 199 | 10 | 33 | 64 |
| I.125 | B2 | 50/20 | S1 | 203 | 10 | 5 | 67 |
| I.126 | B3 | 50/50 | S1 | 254 | 7 | 35 | 68 |
| I.126 | B2 | 50/20 | S1 | 258 | 10 | 42 | 71 |
| I.127 | B3 | 50/50 | S1 | 151 | 26 | 61 | |
| I.127 | B2 | 50/20 | S1 | 176 | 23 | 61 | |
| I.128 | B3 | 50/50 | S1 | 270 | 2 | 9 | 45 |
| I.128 | B2 | 50/20 | S1 | 260 | 0 | 0 | 1 |
| I.134 | B3 | 50/50 | S1 | 260 | 2 | 5 | 10 |
| I.134 | B2 | 50/20 | S1 | 264 | 7 | 8 | 11 |
| I.136 | B3 | 50/50 | S1 | 189 | 12 | 14 | 47 |
| I.136 | B2 | 50/20 | S1 | 180 | 12 | 26 | 51 |
| I.138 | B3 | 50/50 | S1 | 208 | 6 | 19 | 26 |
| I.138 | B2 | 50/20 | S1 | 191 | 8 | 19 | 35 |
| I.140 | B3 | 50/50 | S1 | 198 | 89 | | |
| I.140 | B2 | 50/20 | S1 | 203 | 89 | | |
| I.141 | B3 | 50/50 | S1 | 150 | 57 | | |
| I.141 | B2 | 50/20 | S1 | 192 | 28 | | |
| I.142 | B3 | 50/50 | S1 | 182 | 0 | 1 | 23 |
| I.142 | B2 | 50/20 | S1 | 190 | 1 | 0 | 5 |
| II.5 | B3 | 50/50 | S1 | 177 | | | |
| II.5 | B2 | 50/20 | S1 | 270 | 72 | | |
| II.7 | B4 | 50/50 | S1 | 238 | 57 | 87 | |
| II.7 | B4 | 99/50 | S1 | 248 | | | |
| II.7 | B4 | 99/50 | S1 | 196 | | | |
| II.9 | B4 | 50/50 | S1 | 235 | 90 | | |
| II.13 | B3 | 50/50 | S1 | 188 | 7 | 12 | 19 |
| II.13 | B2 | 50/20 | S1 | 199 | 5 | 10 | 17 |
| II.15 | B3 | 50/50 | S1 | 205 | 5 | 10 | 14 |
| II.15 | B2 | 50/20 | S1 | 117 | 3 | 6 | 11 |
| II.22 | B3 | 50/20 | S1 | 144 | 3 | 4 | 10 |
| II.22 | B2 | 50/20 | S1 | 168 | 2 | 0 | 2 |
| II.22 | B3 | 50/50 | S1 | 15S | 0 | 2 | 7 |
| II.23 | B3 | 50/50 | S2 | 196 | 28 | 40 | 82 |
| II.23 | B2 | 50/20 | S2 | 239 | 23 | 64 | S5 |
| II.26 | B3 | 50/50 | S1 | 138 | 4 | | |
| II.26 | B2 | 50/20 | S1 | 218 | 68 | | |
| II.27 | B2 | 50/20 | S1 | 169 | 10 | 10 | 14 |
| II.27 | B3 | 50/50 | S1 | 125 | | | |
| II.34 | B3 | 50/50 | S1 | 145 | 93 | | |
| II.34 | B2 | 50/20 | S1 | 166 | 94 | | |
| II.35 | B3 | 50/50 | S1 | 136 | | | |
| II.35 | B2 | 50/20 | S1 | 1S7 | 83 | | |
| II.45 | B3 | 50/50 | S1 | 236 | 8S | | |
| II.45 | B2 | 50/20 | S1 | 227 | 76 | | |
| II.51 | B3 | 50/50 | S1 | 171 | 81 | | |

TABLE 7-continued

| dye | binder | mg dye/ mg binder | solvent | $D_{max}$ | % density loss 5 h | 15 h | 30 h |
|---|---|---|---|---|---|---|---|
| II.51 | B2 | 50/20 | S1 | 207 | 90 | | |
| II.52 | B3 | 50/50 | S1 | 146 | 79 | | |
| II.59 | B3 | 50/50 | S1 | 199 | 95 | | |
| II.59 | B2 | 50/20 | S1 | 228 | 96 | | |
| II.61 | B3 | 50/50 | S1 | 204 | 96 | | |
| II.61 | B2 | 50/20 | S1 | 237 | 96 | | |
| II.63 | B3 | 50/50 | S1 | 261 | 4 | | |
| II.65 | B2 | 50/20 | S1 | 244 | | | |
| II.70 | B2 | 50/20 | S1 | 156 | 95 | | |
| II.70 | B3 | 50/50 | S1 | 133 | 94 | | |
| II.87 | B3 | 50/50 | S1 | 177 | S5 | | |
| II.87 | B2 | 50/20 | S1 | 192 | S4 | | |
| II.91 | B3 | 50/50 | S1 | 133 | 93 | | |
| II.91 | B2 | 50/20 | S1 | 157 | 94 | | |
| II.92 | B3 | 50/50 | S1 | 139 | 83 | | |
| II.92 | B2 | 50/20 | S1 | 157 | 88 | | |
| II.100 | B3 | 50/50 | S1 | 148 | 78 | | |
| II.100 | B2 | 50/200 | S1 | 172 | S0 | | |
| II.110 | B2 | 100/20 | S1 | 110 | 22 | 41 | 6 |
| II.110 | B2 | 99/20 | S1 | 110 | 22 | 41 | 6 |
| II.112 | B2 | 50/20 | S1 | 207 | 51 | 88 | |
| II.112 | B2 | 50/20 | S1 | 207 | 51 | 88 | |
| II.112 | B4 | 50/50 | S1 | 188 | | | |
| II.113 | B3 | 50/50 | S1 | 155 | 53 | 85 | |
| II.113 | B3 | 50/50 | S1 | 155 | 53 | 83 | |
| II.113 | B2 | 50/20 | S1 | 161 | 88 | | |
| II.115 | B3 | 50/50 | S1 | 179 | 1 | 4 | 7 |
| II.115 | B2 | 50/20 | S1 | 196 | 3 | 2 | 5 |
| II.116 | B2 | 50/20 | S1 | 184 | 0 | 2 | 5 |
| II.116 | B3 | 50/50 | S1 | 165 | 2 | 7 | 11 |
| II.118 | B3 | 50/50 | S1 | 148 | 5 | 9 | 16 |
| II.118 | B2 | 50/20 | S1 | 148 | 2 | 5 | 12 |
| II.123 | B3 | 50/50 | S1 | 174 | 4 | 9 | 17 |
| II.123 | B2 | 50/20 | S1 | 194 | 13 | 14 | 21 |
| II.124 | B2 | 50/20 | S1 | 115 | 7 | 17 | 30 |
| II.127 | B3 | 50/50 | S1 | 115 | 86 | | |
| II.127 | B2 | 50/20 | S1 | 132 | 87 | | |
| II.128 | B2 | 50/20 | S1 | 117 | 82 | | |
| II.129 | B3 | 50/20 | S1 | 131 | 82 | | |
| II.129 | B2 | 50/20 | S1 | 151 | 8 | | |
| II.130 | B3 | 50/20 | S1 | 125 | 8 | | |
| II.130 | B2 | 50/20 | S1 | 134 | 84 | | |
| II.131 | B3 | 50/50 | S1 | 133 | 91 | | |
| II.131 | B2 | 50/20 | S1 | 159 | 92 | | |
| II.132 | B3 | 50/20 | S1 | 200 | 79 | | |
| II.132 | B2 | 50/20 | S1 | 209 | 79 | | |
| II.133 | B3 | 50/50 | S1 | 232 | 62 | | |
| II.133 | B2 | 50/20 | S1 | 239 | 62 | | |
| III.9 | B2 | 200/40 | S1 | 134 | 13 | 10 | 20 |
| IV.1 | B3 | 50/50 | S2 | 141 | 30 | 74 | |
| IV.1 | B2 | 50/20 | S2 | 117 | 29 | 69 | |
| IV.2 | B3 | 50/50 | S2 | 115 | 23 | 69 | |
| IV.7 | B3 | 50/50 | S1 | 184 | 21 | 65 | 92 |
| IV.7 | B2 | 50/20 | S1 | 218 | 17 | 60 | 93 |
| IV.21 | B2 | 50/50 | S1 | 142 | 33 | 79 | |
| IV.21 | B2 | 50/20 | S1 | 230 | 23 | 76 | |
| V.15 | B2/B3 | 50/50 | S1 | 152 | | | |

(a)transmission density

I claim:

1. Dye corresponding to the following formula

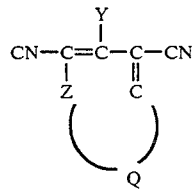

wherein

Z represents CN, COOR$^1$ or CONR$^2$R$^3$;

Q represents the necessary atoms to complete a heterocyclic ring;

R$^1$, R$^2$ and R$^3$ each independently represent hydrogen, alkyl, cycloalkyl, aryl, or R$^2$ and R$^3$ together represent the necessary atoms to close a heterocyclic nucleus;

Y represents OR$^4$ or NR$^5$R$^6$;

R$^4$ represents hydrogen, alkyl, cycloalkyl, aryl, SO$_2$R$^7$, COR$^7$, CSR$^7$, POR$^7$R$^8$;

R$^5$ and R$^6$ each independently has one of the significances given to R$^4$ or represent amino, or R$^5$ and R$^6$ together represent the necessary atoms to close a heterocyclic nucleus, including a heterocyclic nucleus with an aliphatic or aromatic ring fused-on;

R$^7$ and R$^8$ each independently represent alkyl, cycloalkyl, alkenyl, aralkyl, aryl, alkyloxy, aryloxy, alkylthio, arylthio, amino or a heterocyclic group or R$^7$ and R$^8$ together represent the necessary atoms to close a 5- or 6-membered ring, with the proviso that Y is not a NH$_2$-group.

2. Dye corresponding to the following formula

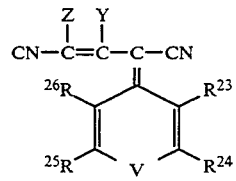

wherein

Z represents CN, COOR$^1$ or CONR$^2$R$^3$;

R$^1$, R$^2$ and R$^3$ each independently represent hydrogen, alkyl, cycloalkyl, aryl, or R$^2$ and R$^3$ together represent the necessary atoms to close a heterocyclic nucleus;

Y represents OR$^4$ or NR$^5$R$^6$;

R$^4$ represents hydrogen, alkyl, cycloalkyl, aryl, SO$_2$R$^7$, COR$^7$, CSR$^7$, POR$^7$R$^8$;

R$^5$ and R$^6$ each independently has one of the significances given to R$^4$ or represent amino, or R$^5$ and R$^6$ together represent the necessary atoms to close a heterocyclic nucleus, including a heterocyclic nucleus with an aliphatic or aromatic ring fused-on;

R$^7$ and R$^8$ each independently represent alkyl, cycloalkyl, alkenyl, aralkyl, aryl, alkyloxy, aryloxy, alkylthio, arylthio, amino or a heterocyclic group or R$^7$ and R$^8$ together represent the necessary atoms to close a 5- or 6-membered ring;

V represents O, S, Se, Te, NR$^{27}$;

R$^{23}$, R$^{24}$, R$^{25}$ and R$^{26}$ each independently represent hydrogen, alkyl, alkenyl, cycloalkyl, aryl, alkyloxycarbonyl, aryloxycarbonyl, carbonamido, or R$^{23}$ and R$^{24}$ together and/or R$^{25}$ and R$^{26}$ together represent the necessary atoms to close (a) ring(s) fused-on the nucleus and R$^{27}$ represents hydrogen, alkyl, cycloalkyl, aryl or amino, with the provision that Y is not a NH$_2$-group.

* * * * *

UNITED STATES PATENT AND TRADEMARK OFFICE
CERTIFICATE OF CORRECTION

PATENT NO. : 5,371,228
DATED : December 6, 1994
INVENTOR(S) : Luc Jerome Vanmaele It is certified that error appears in the above-indentified patent and that said Letters Patent is hereby corrected as shown below: On the title page, items:

[75] Inventor: "Lochristi" should read--Lochristi, Belgium--;

[73] Assignee: "Mortsel" should read -- Mortsel, Belgium --;

Column 1, line 55, "P 85/229792" should read--JP 85/229792--;

Column 2, line 18, "$OR^4NR^5R^6$" should read -- $OR^4$ or $NR^5R^6$ --;

Column 24, nos. II.13, II.14 and II.15, and Column 26,
    nos. II.18 and II.19, formula $R^9$:

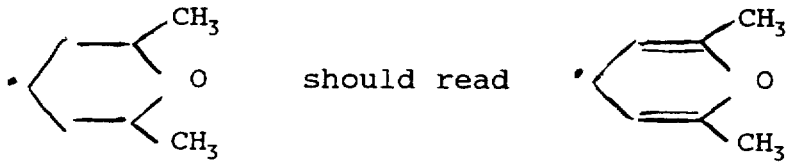

Column 24, no. II.16, formula $R^9$:

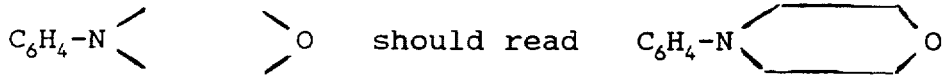

Column 33, no. II.73, formula Y, "D" should read -- O --;

Column 41, no. II.107, formula Y, "D" should read -- O --;

Column 47, no. II.132, formula Y, "D" should read -- O --;

Column 49, line 25, "Y is $NR^5SR^6$" should read --Y is $NR^5R^6$--;

UNITED STATES PATENT AND TRADEMARK OFFICE
CERTIFICATE OF CORRECTION

PATENT NO. : 5,371,228

DATED : December 6, 1994

INVENTOR(S) : Luc Jerome Vanmaele

It is certified that error appears in the above-indentified patent and that said Letters Patent is hereby corrected as shown below:

Column 85, line 24, "GB-P 13016757" should read
-- GB-P 1301657 --;

Column 90, line 2, "is given Lo" should read --is given to--;

Column 90, line 33, "are referred Lo" should read
-- are referred to --;

Column 90, line 67, "the receiver Sheet" should read
-- the receiver sheet --;

Column 91, line 11, "tight Stabilizers)" should read
-- Light Stabilizers) --;

Column 93, line 28, "stirred for hours" should read
-- stirred for 2 hours --;

Column 94, line 53, "dye I91." should read -- dye I.91. --;

Column 102, line 46, last column, "2506" should read
-- 25036 --;

Column 102, line 56, "6 $\mu$pm thick" should read --6 $\mu$m thick--;

Column 103, line 14, "14% by weight," should read
-- 14.4% by weight, --;

Column 103, line 37, first dye I.28 listing, under binder
column "B2" should read -- B3 --;

Column 103, line 64, third dye I.85 listing, under binder
column "B2" should read -- B3 --;

UNITED STATES PATENT AND TRADEMARK OFFICE
CERTIFICATE OF CORRECTION

PATENT NO. : 5,371,228

DATED : December 6, 1994

INVENTOR(S) : Luc Jerome Vanmaele

It is certified that error appears in the above-indentified patent and that said Letters Patent is hereby corrected as shown below:

Column 104, lines 27 and 28, first and second dye I.122 listings, under 5 h column "4" should read -- 43 --;

Column 104, line 33, second dye I.125 listing, under 15 h column "5" should read -- 35 --;

Column 104, line 57, third dye II.22 listing, under $D_{max}$ column "15S" should read -- 158 --;

Column 104, line 59, second dye II.23 listing, under 30 h column "S5" should read -- 85 --;

Column 104, line 60, first dye II.26 listing, under 5 h column "4" should read -- 49 --;

Column 104, line 66, second dye II.35 listing, under $D_{max}$ column "1S7" should read -- 187 --;

Column 104, line 67, first dye II.45 listing, under 5 h column "8S" should read -- 88 --;

Column 105, line 10, under dye column "II.63" should read -- II.65 -- and under 5 h column "4" should read -- 94 --;

Column 105, line 11, under 5 h column, insert -- 93 --;

Column 105, line 14, first dye II.87 listing, under 5 h column "SS" should read -- 88 --;

Column 105, line 15, second dye II.87 listing, under 5 h column "S4" should read -- 84 --;

UNITED STATES PATENT AND TRADEMARK OFFICE
CERTIFICATE OF CORRECTION

PATENT NO. : 5,371,228

DATED : December 6, 1994

INVENTOR(S) : Luc Jerome Vanmaele

It is certified that error appears in the above-indentified patent and that said Letters Patent is hereby corrected as shown below:

Column 105, line 20, second dye II.100 listing, under 5 h column "S0" should read -- 80 --;

Column 105, line 21, first dye II.110 listing, under 30 h column "6" should read -- 69 --;

Column 105, line 22, second dye II.110 listing, under 30 h column "6" should read -- 69 --;

Column 105, line 27, third dye II.113 listing, under 5 h column "88" should read -- 3 -- and under 15 h column insert 88;

Column 105, line 39, second dye II.129 listing, under 5 h column "8" should read -- 83 --;

Column 105, line 40, first dye II.130 listing, under 5 h column "8" should read -- 83 --;

Column 105, line 44, first dye II.132 listing, under mg binder column "50/20" should read -- 50/50 --;

UNITED STATES PATENT AND TRADEMARK OFFICE
CERTIFICATE OF CORRECTION

PATENT NO. : 5,371,228
DATED : December 6, 1994
INVENTOR(S) : Luc Jerome Vanmaele It is certified that error appears in the above-indentified patent and that said Letters Patent is hereby corrected as shown below:

Column 106, formula of claim 1:

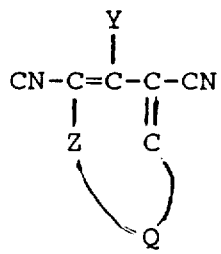     should read     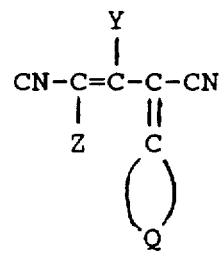

Signed and Sealed this

Thirtieth Day of January, 1996

Attest:

BRUCE LEHMAN

Attesting Officer      Commissioner of Patents and Trademarks